US012619183B2

(12) United States Patent
Sakamaki

(10) Patent No.: US 12,619,183 B2
(45) Date of Patent: May 5, 2026

(54) CONTROL FOR CONVEYING A CONTINUOUS SHEET IN AN IMAGE FORMING APPARATUS

(71) Applicant: Konica Minolta, Inc., Tokyo (JP)

(72) Inventor: Tsutomu Sakamaki, Kanagawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/748,260

(22) Filed: Jun. 20, 2024

(65) Prior Publication Data

US 2024/0427273 A1 Dec. 26, 2024

(30) Foreign Application Priority Data

Jun. 23, 2023 (JP) ................................ 2023-103657

(51) Int. Cl.
*G03G 15/00* (2006.01)
*G03G 15/20* (2006.01)

(52) U.S. Cl.
CPC ..... *G03G 15/5029* (2013.01); *G03G 15/2032* (2013.01); *G03G 15/2064* (2013.01); *G03G 15/6517* (2013.01); *G03G 15/6573* (2013.01); *G03G 2215/00455* (2013.01)

(58) Field of Classification Search
CPC ........... G03G 15/5029; G03G 15/2032; G03G 15/2064; G03G 15/6573; G03G 15/652; G03G 15/5045; G03G 15/505; G03G 15/6517; G03G 2215/00455; G03G 2215/00447
See application file for complete search history.

(56) References Cited

U.S. PATENT DOCUMENTS 5,623,331 A * 4/1997 Kaneko .............. G03G 15/2028 399/328
9,022,386 B2 * 5/2015 Kasamai .................. B65H 7/06 271/272
10,481,541 B2 * 11/2019 Hiroe ................... G03G 15/652
2010/0232818 A1 * 9/2010 Kunii ................. G03G 15/2039 399/45
2016/0161895 A1 * 6/2016 Sasaki ................ G03G 15/6591 399/407

(Continued)

FOREIGN PATENT DOCUMENTS

JP 2010-072493 A 4/2010

*Primary Examiner* — Stephanie E Bloss
*Assistant Examiner* — Laura Roth
(74) *Attorney, Agent, or Firm* — LUCAS & MERCANTI, LLP

(57) ABSTRACT

Provided is an image forming apparatus capable of printing on continuous sheet. The image forming apparatus includes: a fixing section that fixes an image on an unfixed surface of the continuous sheet while conveying the continuous sheet by a fixing nip; a downstream-side conveyance section that is disposed on a downstream side of the fixing section in a sheet conveyance direction and conveys the continuous sheet by a downstream-side conveyance nip; a detection section that detects a physical amount related to a thermal expansion state of a fixing member that forms the fixing nip; and a control section that controls driving aspects of the fixing section and the downstream-side conveyance section based on a detection result by the detection section.

18 Claims, 11 Drawing Sheets

(56) References Cited

U.S. PATENT DOCUMENTS

| | | | | |
|---|---|---|---|---|
| 2016/0202648 | A1* | 7/2016 | Takada | G03G 15/5029<br>399/69 |
| 2016/0259277 | A1* | 9/2016 | Umeno | G03G 15/2064 |
| 2016/0282775 | A1* | 9/2016 | Ui | B65H 43/00 |
| 2017/0308012 | A1* | 10/2017 | Kibayashi | G03G 15/2028 |
| 2023/0091128 | A1* | 3/2023 | Yamaguchi | G03G 15/6573<br>399/381 |
| 2023/0176510 | A1* | 6/2023 | Yamada | G03G 15/652 |

* cited by examiner

CONTROL FOR CONVEYING A CONTINUOUS SHEET IN AN IMAGE FORMING APPARATUS

CROSS REFERENCE TO RELATED APPLICATIONS

The entire disclosure of Japanese Patent Application No. 2023-103657, filed on Jun. 23, 2023, is incorporated herein by reference in its entirety.

BACKGROUND

Technological Field

The present invention relates to an image forming apparatus, a conveyance method, and a non-transitory computer-readable recording medium storing a program.

Description of Related Art

In an image forming apparatus (a printer, a copying machine, a facsimile, or the like) using an electrophotographic process technology, laser light based on image data is emitted (exposed) to a uniformly charged photoreceptor so that an electrostatic latent image is formed on a surface of the photoreceptor. Then, a toner is supplied to the photoreceptor, whereby the electrostatic latent image is visualized as a toner image. The toner image is, for example, indirectly transferred onto a recording material via an intermediate transfer member, and then heated and pressurized in a fixing section. Through the above process, an image is formed on the recording material. In addition to flat sheet, continuous sheet such as machine-glazed sheet may be used as the recording material.

The above-described electrophotographic image forming apparatus includes conveyance nips at a plurality of positions on a conveyance path of the recording material. The conveyance nip includes a fixing nip of the fixing section. The conveyance nip is formed by a pair of conveyance members. In particular, the fixing nip is formed by a pair of fixing members (for example, a fixing roller and a pressure roller). One of the pair of conveyance members (the fixing member in the case of the fixing nip) is formed by a rotatably drivable driving roller. By passing a recording material through the conveyance nip, the rotational force of the driving roller is transmitted to the recording material, and the recording material is conveyed.

In the case of printing on continuous sheet, the continuous sheet is passed through the fixing nip of the fixing section and a conveyance nip of a downstream-side conveyance section (hereinafter, referred to as "downstream-side conveyance nip") disposed on the downstream of the fixing section in the sheet conveyance direction.

In the fixing section, usually, a pair of fixing members forming the fixing nip is held in a state of being separated from each other so that damage such as discoloration does not occur on the continuous sheet due to heat transmission from the fixing members during non-printing in which printing on the continuous sheet is not performed, and is brought into pressure contact with each other at the start of printing. At the start of printing, the conveyance of the continuous sheet is started at a timing when a fixing nip having a predetermined width is formed in a process in which the fixing member shifts from a separated state to a pressure-contact state. Further, at the end of printing, in the process in which the fixing member shifts from the pressure-contact state to the separated state, the nip width becomes equal to or smaller than the predetermined width, and the conveyance of the continuous sheet is stopped at a timing when the fixing nip is released.

Here, in a case where a conveyance start timing of the continuous sheet by the fixing nip (timing at which continuous sheet starts moving) is earlier than a conveyance start timing of the continuous sheet by the downstream-side conveyance nip, slack occurs in the continuous sheet, and a failure in which the continuous sheet winds around the fixing member may occur. In addition, in a case where a conveyance stop timing of the continuous sheet by the fixing nip is later than a conveyance stop timing of the continuous sheet by the downstream-side conveyance nip, slack also occurs in the continuous sheet, and a failure in which the continuous sheet winds around the fixing member may occur. Hereinafter, the conveyance start timing and the conveyance stop timing in the fixing section and the conveyance start timing and the conveyance stop timing in the downstream-side conveyance section are referred to as "fixing-side conveyance start timing", "fixing-side conveyance stop timing", "downstream-side conveyance start timing", and "downstream-side conveyance stop timing", respectively.

Furthermore, in a case where the downstream-side conveyance start timing is earlier than the fixing-side conveyance start timing, the continuous sheet cannot be conveyed only by the downstream-side conveyance nip, and the continuous sheet may slip at the downstream-side conveyance nip, causing abnormal noise. Such a failure is likely to occur particularly in the case of using continuous sheet having a large sheet thickness and a large conveyance load.

Conventionally, the operations of the respective driving rollers are controlled such that abnormal noise due to slack or slip of the continuous sheet does not occur in the fixing section and the downstream-side conveyance section. Specifically, the operation of the driving roller in the downstream-side conveyance section is controlled on the assumption that the fixing-side conveyance start timing and the fixing-side conveyance stop timing are constant. The "fixing-side conveyance start timing is constant" means that the time required from the start of a shifting operation from the separated state to the pressure-contact state (hereinafter, referred to as a "pressure-contact operation") to the formation of a fixing nip having a predetermined width is formed is constant. Furthermore, the "the fixing-side conveyance stop timing is constant" means that the time required from the start of a shifting operation from the pressure-contact state to the separated state (hereinafter, referred to as the "separation operation") to the release of the fixing nip is constant. That is, the driving roller of the downstream-side conveyance section is controlled so as to start or stop driving after a predetermined time based on the time point when the pressure-contact operation or the separation operation is started in the fixing section.

However, the fixing member is usually provided with an elastic layer formed of a resin material having a relatively large thermal expansion coefficient, such as silicone rubber. Therefore, depending on the thermal expansion state of the elastic layer, the timing at which the fixing nip is formed and the timing at which the fixing nip is released change. In this case, in the conventional control on the assumption that the fixing-side conveyance start timing and the fixing-side conveyance stop timing are constant, a deviation may occur between the conveyance start timings and the conveyance stop timings in the fixing section and the downstream-side conveyance section, and thus it may become impossible to prevent a failure such as slack from occurring in the continuous sheet.

Patent Literature 1 (Japanese Patent Application Laid-Open No. 2010-72493) discloses that in consideration of thermal expansion of a fixing roller, driving speeds of the fixing roller and an upstream registration roller are corrected based on a temperature change in an apparatus main body. However, there is no disclosure about the driving control in the fixing section and the downstream-side conveyance section.

SUMMARY

An object of the present invention is to provide an image forming apparatus, a conveyance method, and a non-transitory computer-readable recording medium storing a program, each of which is capable of preventing a failure such as slack that may occur in continuous sheet, and is capable of appropriately conveying the continuous sheet.

In order to achieve at least one of the above-described objects, an image forming apparatus reflecting one aspect of the present invention is an image forming apparatus capable of printing on continuous sheet, and the image forming apparatus includes: a fixing section that fixes an image on an unfixed surface of the continuous sheet while conveying the continuous sheet by a fixing nip; a downstream-side conveyance section that is disposed on a downstream side of the fixing section in a sheet conveyance direction and conveys the continuous sheet by a downstream-side conveyance nip; a detection section that detects a physical amount related to a thermal expansion state of a fixing member that forms the fixing nip; and a control section that controls a driving aspect of at least one of the fixing section and/or the downstream-side conveyance section based on a detection result by the detection section.

A conveyance method reflecting one aspect of the present invention is a conveyance method in an image forming apparatus capable of printing on continuous sheet, and the conveyance method includes: conveying the continuous sheet by a fixing nip that fixes an image on an unfixed surface of the continuous sheet; conveying the continuous sheet by a downstream-side conveyance nip disposed on a downstream side of the fixing nip in a sheet conveyance direction; detecting a physical amount related to a thermal expansion state of a fixing member that forms the fixing nip; and controlling a driving aspect of at least one of a fixing section, in which the fixing nip is disposed, and/or a downstream-side conveyance section, in which the downstream-side conveyance nip is disposed, based on the detected physical amount related to the thermal expansion state.

In a non-transitory computer-readable recording medium storing a program reflecting one aspect of the present invention, the program causes a computer of an image forming apparatus capable of printing on continuous sheet to execute predetermined processing, and the predetermined processing includes: conveying the continuous sheet by a fixing nip that fixes an image on an unfixed surface of the continuous sheet; conveying the continuous sheet by a downstream-side conveyance nip disposed on a downstream side of the fixing nip in a sheet conveyance direction; detecting a physical amount related to a thermal expansion state of a fixing member that forms the fixing nip; and controlling a driving aspect of at least one of a fixing section, in which the fixing nip is disposed, and a downstream-side conveyance section, in which the downstream-side conveyance nip is disposed, based on the detected physical amount related to the thermal expansion state.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Hereinafter, an embodiment of the present invention will be described in detail with reference to the accompanying drawings.

Figure 1:
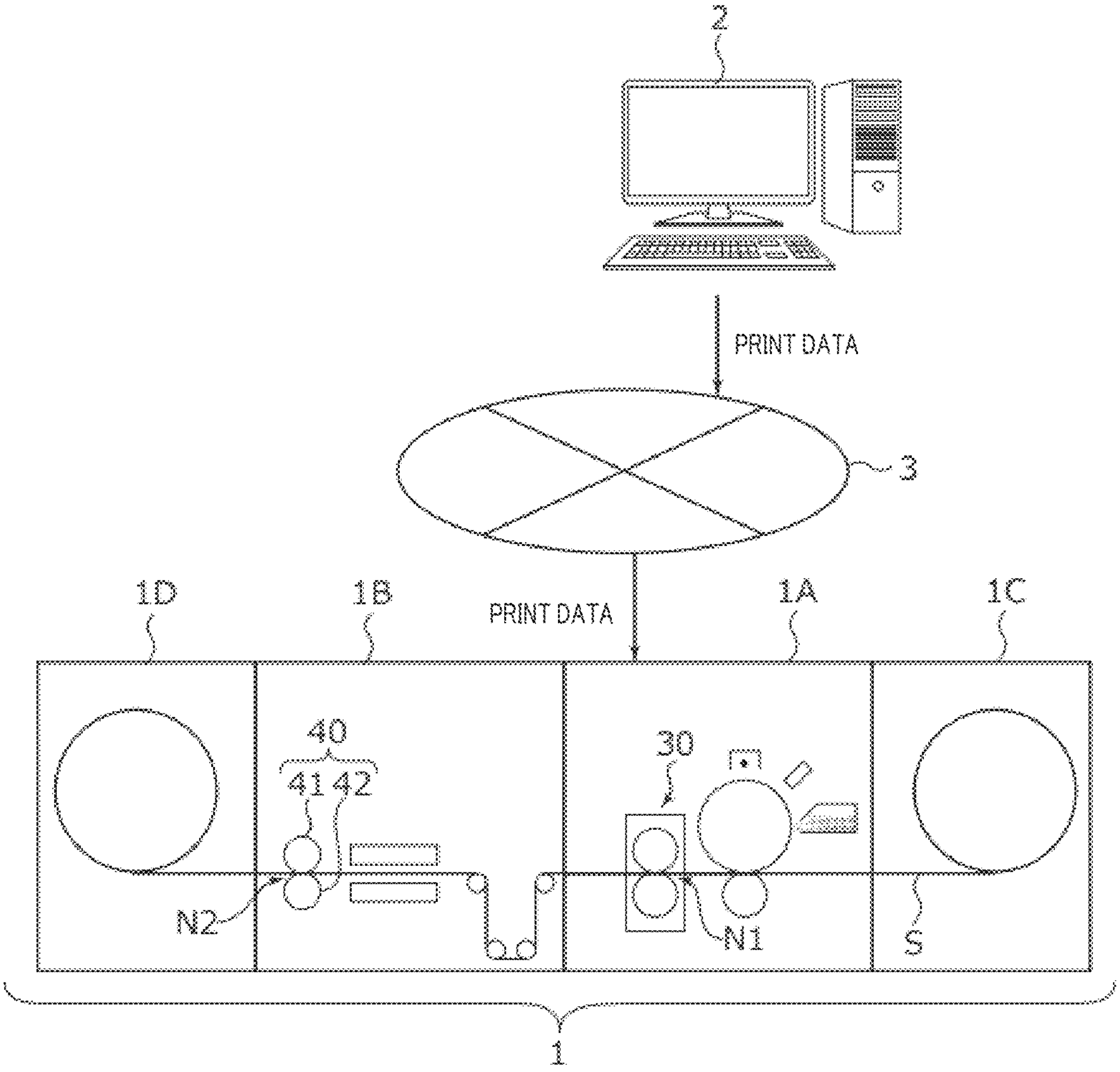
FIG. 1 is a diagram illustrating a system configuration of an image forming apparatus according to an embodiment of the present disclosure.

FIG. 1 is a diagram illustrating a system configuration of image forming apparatus 1 according to an embodiment.

As illustrated in FIG. 1, image forming apparatus 1 includes image forming apparatus main body 1A, image calibration control unit (ICCU) 1B, sheet feed unit 1C, and winding unit 1D.

In image forming apparatus 1, control section 11 (see FIG. 3) of image forming apparatus main body 1A functions as a printer controller and controls, based on print data transmitted from client terminal 2, image calibration control unit 1B, sheet feed unit 1C, and winding unit 1D, together with the blocks of image forming apparatus main body 1A.

Image forming apparatus main body 1A is connected to client terminal 2 via communication network 3 such as a local area network (LAN) or a wide area network (WAN), for example. Image forming apparatus main body 1A performs printing on continuous sheet S, for example, based on the print data from client terminal 2.

Image calibration control unit 1B inspects and calibrates an image formed by image forming apparatus main body 1A. Image calibration control unit 1B is disposed on the downstream side of image forming apparatus main body 1A in the sheet conveyance direction. Image calibration control unit 1B includes downstream-side conveyance section 40 capable of conveying continuous sheet S.

Downstream-side conveyance section 40 includes downstream-side driving roller 41 and driven roller 42. Downstream-side driving roller 41 and driven roller 42 each have a configuration in which, for example, an elastic layer (e.g., thickness: 5 mm, JIS-A HARDNESS: 60°) formed of silicone rubber or the like is formed on the outer peripheral surface of a columnar core metal formed of iron or the like. The outer diameter of downstream-side driving roller 41 and driven roller 42 is, for example, 24 mm.

Driving control of downstream-side driving roller 41 is performed by control section 11 of image forming apparatus main body 1A. Specifically, control section 11 controls an output to a driving motor (illustration is omitted) connected to downstream-side driving roller 41 to rotate downstream-side driving roller 41 at a set rotation speed.

Downstream-side driving roller 41 and driven roller 42 are held in a state of being in pressure contact with each other with a predetermined pressure-contact load (for example, 20N), and form downstream-side conveyance nip N2. Downstream-side driving roller 41 rotates at the set rotation speed, whereby continuous sheet S passed through downstream-side conveyance nip N2 is conveyed.

Sheet feed unit 1C feeds out continuous sheet S having a roll shape and feeds continuous sheet S to image forming apparatus main body 1A according to an instruction from control section 11 of image forming apparatus main body 1A.

Winding unit 1D winds continuous sheet S discharged from image calibration control unit 1B, according to an instruction from control section 11 of image forming apparatus main body 1A.

Figure 2:
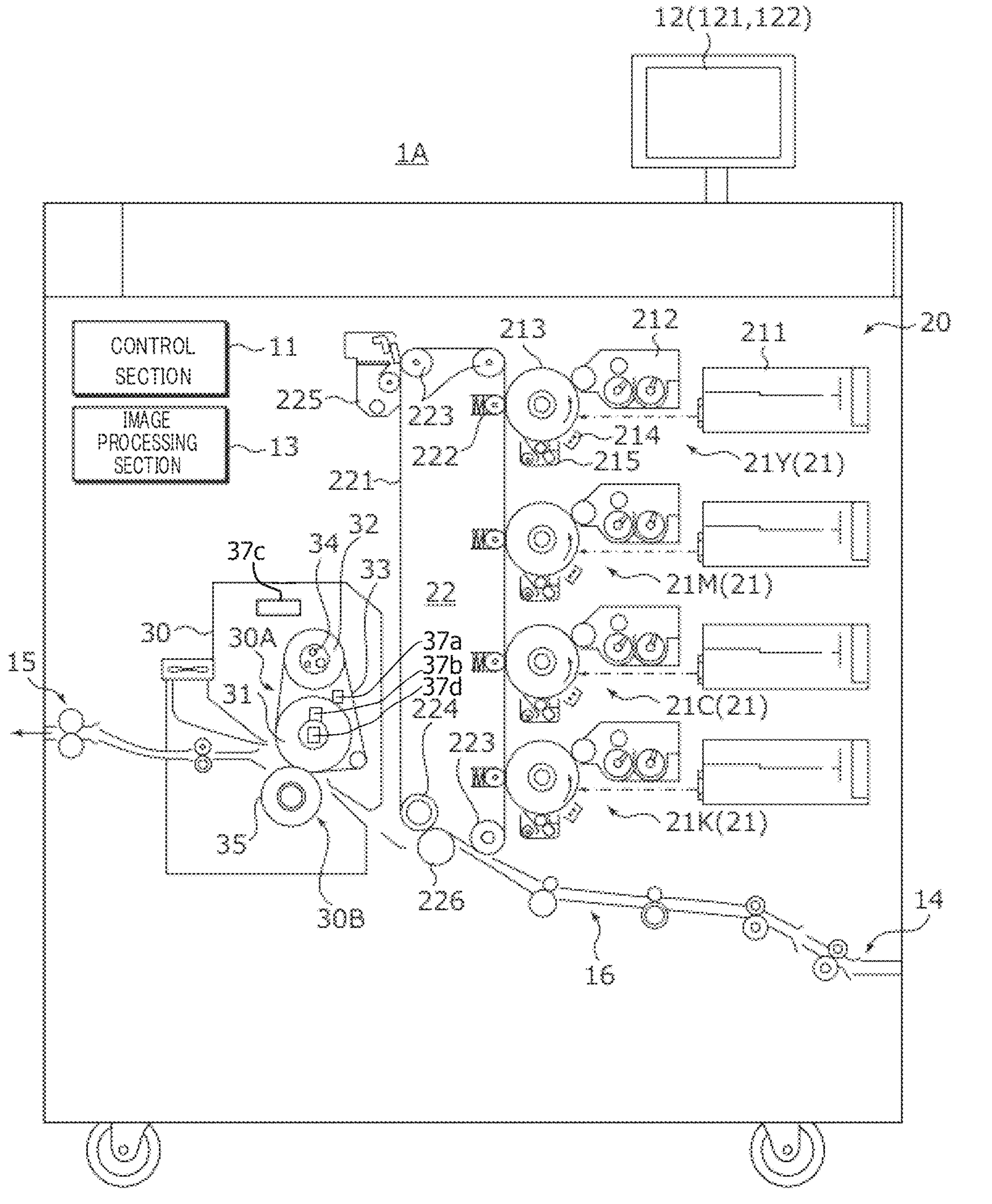
FIG. 2 is a diagram schematically illustrating an overall configuration of an image forming apparatus main body.
Figure 3:
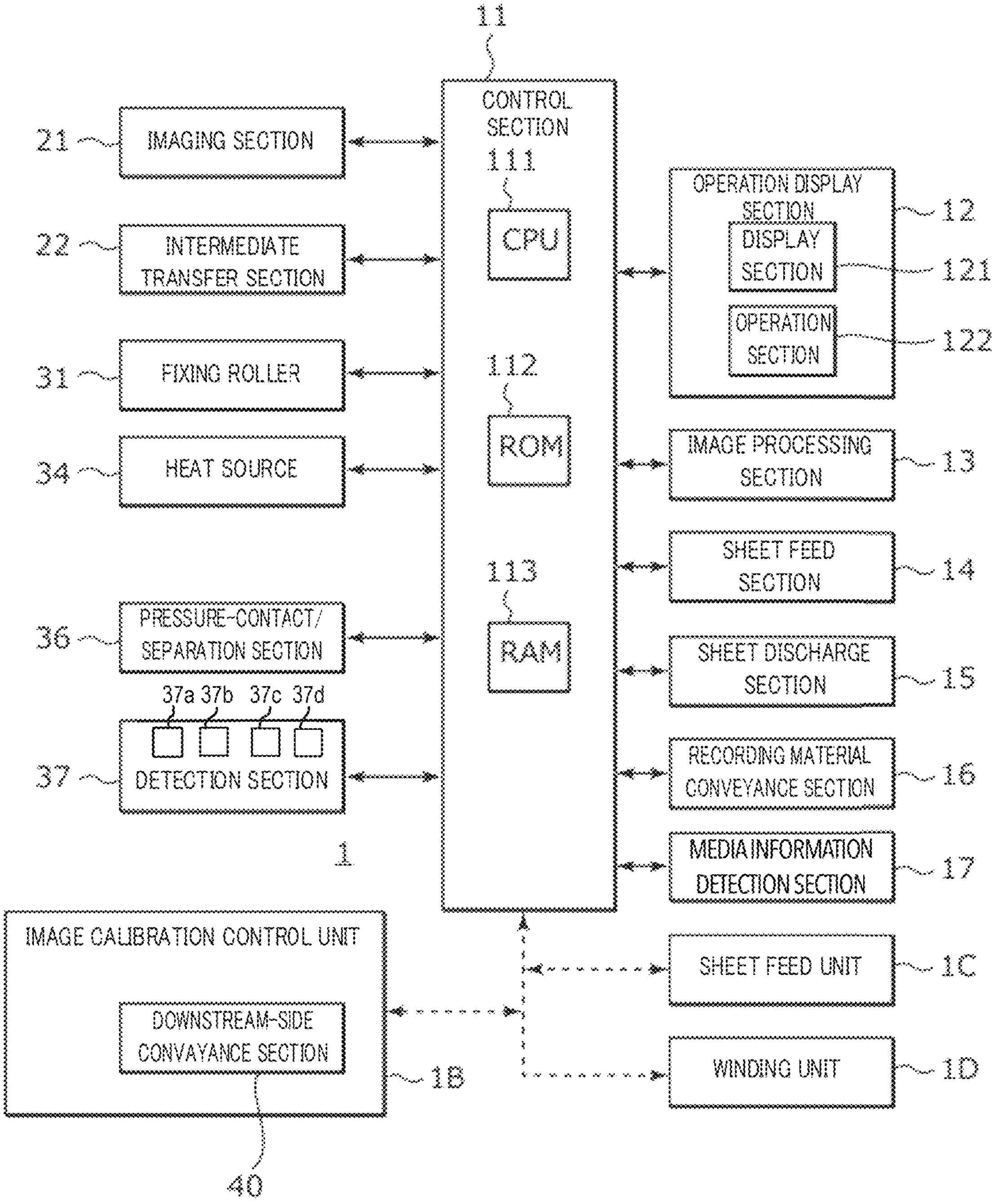
FIG. 3 is a diagram illustrating a main part of a control system of the image forming apparatus.

FIG. 2 is a diagram schematically illustrating an overall configuration of image forming apparatus main body 1A. FIG. 3 is a diagram illustrating a main part of a control system of image forming apparatus 1.

Image forming apparatus main body 1A is a color image forming apparatus of an intermediate transfer method utilizing an electrophotographic process technology. Image forming apparatus main body 1A primarily transfers each color toner image of Y (yellow), M (magenta), C (cyan), and K (black) formed on photosensitive drums 213 to intermediate transfer belt 221, superimposes the toner images of the four colors on intermediate transfer belt 221, and secondarily transfers the toner images to a recording material, thereby forming an image.

In the present embodiment, image forming apparatus main body 1A adopts a vertical tandem system whereby photosensitive drums 213 corresponding to the four colors of CMYK are arranged in series in a travel direction (vertical direction) of intermediate transfer belt 221, and toner images of the respective colors are successively transferred onto intermediate transfer belt 221 by a single procedure.

As illustrated in FIGS. 2 and 3, image forming apparatus main body 1A includes control section 11, operation display section 12, image processing section 13, sheet feed section 14, sheet discharge section 15, recording material conveyance section 16, image forming section 20, fixing section 30, and the like.

Control section 11 is a computer including central processing unit (CPU) 111 as an arithmetic/control apparatus, read only memory (ROM) 112 and random access memory (RAM) 113 as main storage apparatuses, and the like. ROM 112 stores basic programs and basic setting information. Furthermore, a program for realizing image forming processing including conveyance processing and the like is stored in ROM 112. CPU 111 reads a program corresponding to the processing content from ROM 112, develops the program in RAM 113, and executes the developed program, thereby controlling the operation of each functional block of image forming apparatus 1.

Control section 11 performs overall control of image forming apparatus main body 1A by controlling operation display section 12, image processing section 13, sheet feed section 14, sheet discharge section 15, recording material conveyance section 16, image forming section 20, and fixing section 30 according to the respective functions thereof.

In the present embodiment, each hardware constituting the functional blocks and control section 11 cooperate with each other to implement the functions of the functional blocks. Note that some or all of the functions of the functional blocks may be implemented by control section 11 executing a program.

Operation display section 12 is composed of, for example, a flat panel display with a touch screen. As the flat panel display, a liquid crystal display, an organic EL display, or the like can be used. Operation display section 12 includes display section 121 and operation section 122.

Display section 121 displays various operation screens, an image state, an operation state of each function, and the like according to a display control signal input from control section 11.

Operation section 122 includes various operation keys such as a numeric keypad and a start key, receives various input operations from a user, and outputs an operation signal to control section 11. A user can operate operation display section 12 to make settings related to image formation, such as document setting, image quality setting, magnification setting, application setting, output setting, and recording material setting.

Image processing section 13 includes a circuit or the like that applies digital image processing to input image data according to initial settings or user settings. For example, image processing section 13 performs tone correction on the basis of tone correction data under the control of control section 11. Further, image processing section 13 applies, to the input image data, various kinds of correction processing such as color correction, shading correction, and density correction. Image forming section 20 is controlled on the basis of the image data on which the pieces of processing described above have been performed.

Image forming section 20 includes imaging section 21, intermediate transfer section 22, and fixing section 30. Based on the input image data, imaging section 21 forms a toner image with color toners of a Y component, an M component, a C component, and a K component. Intermediate transfer section 22 transfers the toner image formed by imaging section 21 onto a recording material. Fixing section 30 fixes the transferred toner image to the recording material.

Specifically, imaging section 21 is composed of four imaging sections 21Y, 21M, 21C, and 21K for Y, M, C, and K components, respectively. Imaging sections 21Y, 21M, 21C, and 21K have the same configuration, and therefore, for convenience of illustration and description, common constituent elements are denoted by the same reference signs, and when they are distinguished from each other, they are denoted by adding Y, M, C, and K to their reference signs. In FIG. 1, reference signs are provided to the constituent elements of imaging section 21Y for the Y component and the reference signs of the constituent elements of other imaging sections 21M, 21C, 21K are omitted.

Imaging section 21 includes exposure apparatus 211, developing apparatus 212, photosensitive drum 213, charging apparatus 214, drum cleaning apparatus 215, and the like. Although not illustrated, imaging section 21 may include a discharging apparatus for removing residual charge remaining on the surface of photosensitive drum 213 after the primary transfer.

Photosensitive drum 213 is, for example, a negatively charged organic photoconductor (OPC) in which an under coat layer (UCL), a charge generation layer (CGL), and a charge transport layer (CTL) are sequentially laminated on the peripheral surface of a conductive cylindrical body formed of aluminum (aluminum tube). The charge generation layer is formed of an organic semiconductor in which a charge generation material (for example, phthalocyanine pigment) is dispersed in a resin binder (for example, polycarbonate), and generates a pair of positive charge and negative charge upon exposure by exposure apparatus 211. The charge transport layer is formed of a material in which a hole conveyance material (electron-donating nitrogen-containing compound) is dispersed in a resin binder (for example, polycarbonate resin), and conveys positive charges generated in the charge generation layer to the surface of the charge transport layer.

Charging apparatus 214 is composed of, for example, a corona discharge generator such as a scorotron charging apparatus or a corotron charging apparatus. Charging apparatus 214 uniformly and negatively charges the surface of photosensitive drum 213 by corona discharge.

Exposure apparatus 211 is composed of, for example, an LED print head (LPH), and includes an LED array in which a plurality of light emitting diodes (LED) are linearly arranged, an LPH drive section (driver ICs) for driving each LED, a lens array that forms an image on photosensitive drum 213 with light emitted from the LED array, and the like. One LED of the LED array corresponds to one dot of an image.

Exposure apparatus 211 emits light corresponding to images of individual color components to photosensitive drum 213. The positive charges generated in the charge generation layer of photosensitive drum 213 by light emission are conveyed to the surface of the charge transport layer, and thus the surface charges (negative charges) on photosensitive drum 213 are neutralized. Thus, an electrostatic latent image of each color component is formed on the surface of photosensitive drum 213 due to a potential difference from its surroundings.

Developing apparatus 212 accommodates a developer (e.g., two-component-based developer including a toner and a magnetic carrier) of each color component and attaches the toner of each color component to the surface of photosensitive drum 213 to visualize the electrostatic latent image and form a toner image. Specifically, a developing bias voltage is applied to a developer carrier (reference sign is omitted, e.g., a developing roller), and an electric field is formed between photosensitive drum 213 and the developer carrier. Then, due to a potential difference between photosensitive drum 213 and the developer carrier, the charged toner on the developer carrier moves to and adheres to an exposed section on the surface of photosensitive drum 213. Thus, the electrostatic latent image on photosensitive drum 213 is visualized.

Drum cleaning apparatus 215 includes a drum cleaning blade (reference sign is omitted) that comes into sliding contact with the surface of photosensitive drum 213, or the like. Drum cleaning apparatus 215 removes a transfer residual toner remaining on the surface of photosensitive drum 213 after the primary transfer.

Intermediate transfer section 22 includes intermediate transfer belt 221, primary transfer roller 222, a plurality of support rollers 223 and 224, belt cleaning apparatus 225, secondary transfer roller 226, and the like.

Intermediate transfer belt 221 is an image carrier that carries a toner image, and is a transfer target onto which the toner image on photosensitive drum 213 is transferred. Intermediate transfer belt 221 is composed of a belt having an endless shape and is stretched in a loop shape over the plurality of support rollers 223. At least one of the plurality of support rollers 223 is composed of a driving roller, and the others are composed of driven rollers. The rotation of the driving roller causes intermediate transfer belt 221 to travel at a constant speed.

Primary transfer roller 222 is disposed on the inner peripheral surface side of intermediate transfer belt 221 to face photosensitive drum 213 of each color component. Primary transfer roller 222 is brought into pressure contact with photosensitive drum 213 with intermediate transfer belt 221 therebetween, thereby forming a transfer nip (hereinafter, referred to as a "primary transfer section") for transferring a toner image from photosensitive drum 213 to intermediate transfer belt 221.

Support roller 223 includes opposing roller 224 disposed to face secondary transfer roller 226. Secondary transfer roller 226 is disposed on the outer peripheral surface side of intermediate transfer belt 221, and is brought into pressure contact with opposing roller 224 with intermediate transfer belt 221 therebetween. Thus, a transfer nip (hereinafter referred to as a "secondary transfer section") for transferring a toner image from intermediate transfer belt 221 to the recording material is formed.

At the primary transfer section, toner images on photosensitive drum 213 are primarily transferred in a sequentially superposed manner onto intermediate transfer belt 221. Specifically, the toner images are electrostatically transferred onto intermediate transfer belt 221 from photosensitive drum 213 by applying primary transfer voltage to primary transfer roller 222, and applying electric charge having an opposite polarity of the toner to the inner peripheral surface side of intermediate transfer belt 221 (the side on which the primary transfer roller 222 abuts).

Thereafter, when the recording material passes through the secondary transfer section, the toner images on intermediate transfer belt 221 are secondarily transferred onto the recording material. Specifically, the toner images are electrostatically transferred onto the recording material from intermediate transfer belt 221 by applying secondary transfer voltage to secondary transfer roller 226, and applying electric charge having an opposite polarity of the toner to a back surface side of the recording material (a side on which secondary transfer roller 226 abuts). The recording material onto which the toner images have been transferred is conveyed toward fixing section 30.

Belt cleaning apparatus 225 includes a belt cleaning blade (reference sign is omitted) that comes into sliding contact with the surface of intermediate transfer belt 221, or the like. Belt cleaning apparatus 225 removes a transfer residual toner remaining on the surface of intermediate transfer belt 221 after the secondary transfer.

Fixing section 30 includes upper fixing section 30A and lower fixing unit 30B. Upper fixing section 30A is disposed on the fixing surface (the surface on which a toner image is formed) side of the recording material. Lower fixing section 30B is disposed on the side of the back surface (the surface opposite to the fixing surface) of the recording material. A belt nip method in which fixing nip N1 is formed via fixing belt 33 is applied to fixing section 30 illustrated in FIG. 2.

Upper fixing section 30A includes fixing roller 31, heating roller 32, fixing belt 33, heat source 34, and the like. Fixing belt 33 having an endless shape is stretched over fixing roller 31 and heating roller 32 with a predetermined belt tension (e.g., 200 N). Fixing belt 33 is a fixing surface-side member that comes into contact with the fixing surface of continuous sheet S. Driving control of fixing roller 31 (for example, turning on/off rotation, the number of rotations, and the like) and output control of heat source 34 are performed by control section 11.

Fixing roller 31 has a configuration in which, for example, an elastic layer (for example, thickness: 20 mm, JIS-A HARDNESS: 10°) formed of silicone rubber or the like is formed on the outer circumferential surface of a columnar core metal formed of iron or the like. The outer diameter of fixing roller 31 is, for example, 90 mm.

Heating roller 32 has a configuration in which, for example, a resin layer formed of polytetrafluoroethylene (PTFE) or the like is formed on the outer circumferential surface of a cylindrical core metal formed of aluminum or the like. The outer diameter of heating roller 32 is, for example, 80 mm.

Fixing belt 33 has a configuration in which, for example, an elastic layer (e.g., thickness: 220 μm) formed of silicone rubber or the like is formed on the outer surface of a film base material (e.g., thickness: 70 μm) formed of heat-resistant polyimide, and further a surface layer formed of a fluorine-based resin such as perfluoroalkoxy alkane (PFA) or PTFE is formed in a laminated manner.

Heat source 34 is composed of, for example, a halogen heater. Heat source 34 is incorporated in heating roller 32. Heating roller 32 is heated by heat source 34, and heat is transmitted to fixing belt 33.

Lower fixing section 30B includes, for example, pressure roller 35 and pressure-contact/separation section 36. Pressure roller 35 is a back surface-side support member that comes in contact with the back surface of continuous sheet S to support continuous sheet S. Driving control of pressure roller 35 (for example, turning on/off rotation, the number of rotations, and the like) and driving control of the pressure contact/separation section 36 are performed by control section 11.

Pressure roller 35 has a configuration in which, for example, an elastic layer (e.g., thickness: 6 mm, JIS-A HARDNESS: 10°) formed of silicone rubber or the like and a surface layer formed of a fluorine-based resin such as PFA are sequentially formed in a laminated manner on the outer peripheral surface of a columnar core metal formed of iron or the like. The outer diameter of pressure roller 35 is, for example, 80 mm.

Pressure-contact/separation section 36 brings pressure roller 35 closer to fixing roller 31 in the separated state, and brings fixing roller 31 and pressure roller 35 into pressure contact with each other via fixing belt 33. Further, pressure-contact/separation section 36 moves pressure roller 35 away from fixing roller 31 in the pressure-contact state to separate fixing roller 31 and pressure roller 35 from each other.

Figure 4A:
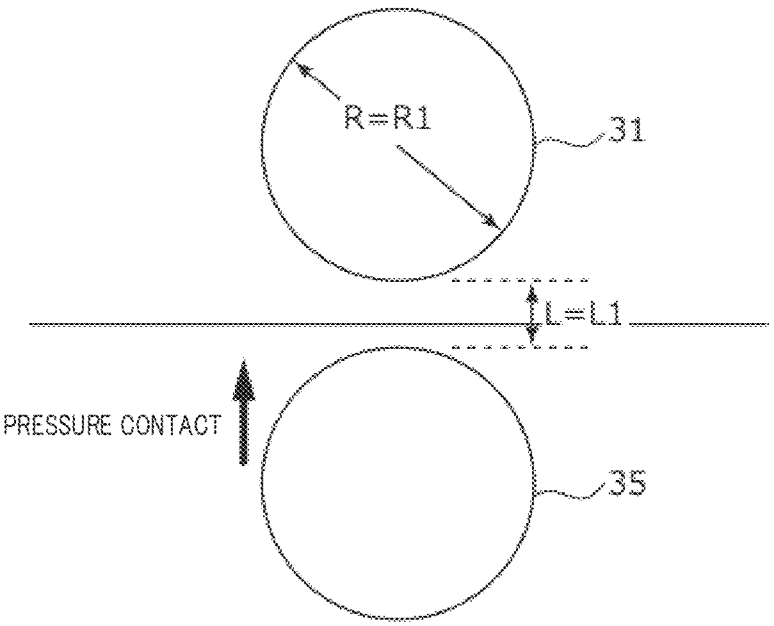
FIGS. 4A and 4B are diagrams schematically illustrating the configuration of a fixing section.
Figure 4B:
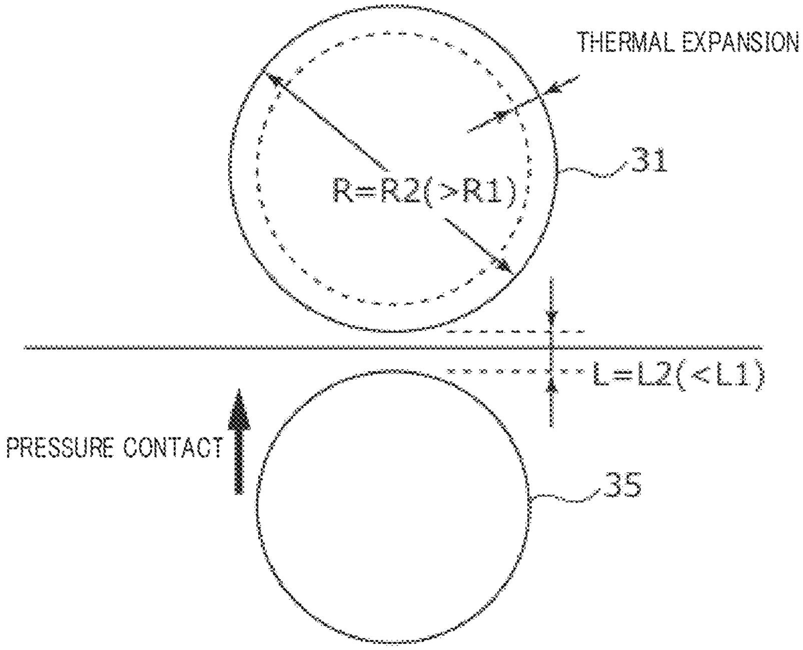

Fixing roller 31 and pressure roller 35 are held in the separated state during non-printing (see FIGS. 4A and 4B). Fixing roller 31 and pressure roller 35 are shifted from the separated state to the pressure-contact state at the start of printing (FIG. 2 shows the pressure-contact state). Pressure roller 35 is brought into pressure contact with fixing roller 31 via fixing belt 33 at a predetermined pressure contact load (for example, 3000 N), so that fixing nip N1 (see FIG. 1) is formed. At the time point when fixing nip N1 of a predetermined length is formed, the rotational force of fixing roller 31 and pressure roller 35 becomes a sufficient conveyance force and the sufficient conveyance force is transmitted to continuous sheet S, whereby conveyance is started. In addition, fixing roller 31 and pressure roller 35 are shifted from the pressure-contact state to the separated state at the end of printing. At the time point when fixing nip N1 becomes a predetermined value, the conveyance of continuous sheet S is stopped.

Typically, fixing roller 31 is composed of a driving roller, and pressure roller 35 is composed of a driven roller. As fixing roller 31 rotates, continuous sheet S passed through fixing nip N1 is conveyed.

Note that a roller nip method in which fixing roller 31 and pressure roller 35 directly come into contact with each other to form fixing nip N1 may be applied to fixing section 30. In this case, one of fixing roller 31 and pressure roller 35 may be composed of a driving roller, or both of fixing roller 31 and pressure roller 35 may be composed of driving rollers.

In the present embodiment, image forming apparatus main body 1A includes detection section 37 that detects a physical amount related to a thermal expansion state of fixing roller 31. The "thermal expansion amount of fixing roller 31" is, specifically, a thermal expansion amount of the elastic layer of fixing roller 31. The "physical amount related to the thermal expansion state" is information having a correlation with the thermal expansion amount of the elastic layer of fixing roller 31. The physical amount related to the thermal expansion state includes, for example, the temperature of each part of fixing section 30, outer diameter R of fixing roller 31, separation distance L between fixing roller 31 and pressure roller 35, the driving torque of fixing roller 31, the driving torque of pressure-contact/separation section 36, and/or the like. Detection section 37 is disposed, for example, inside a housing of fixing section 30.

Continuous sheet S onto which a toner image has been secondarily transferred and which has been conveyed along a sheet passing path is heated and pressurized at fixing nip N1 when passing through fixing section 30. Thus, the toner image is fixed on continuous sheet S.

Sheet feed section 14 is configured to be able to receive continuous sheet fed from sheet feed unit 1C. A sheet feed roller (reference sign is omitted) is disposed in sheet feed section 14. Sheet feed section 14 sends fed continuous sheet S to recording material conveyance section 16 on the downstream side.

A sheet discharge roller (reference sign is omitted) is disposed in sheet discharge section 15. Sheet discharge section 15 discharges continuous sheet S sent from recording material conveyance section 16 toward image calibration control unit 1B on the downstream side.

Recording material conveyance section 16 includes, as recording material conveyance elements, a plurality of conveyance rollers that holds and conveys continuous sheet S. Recording material conveyance section 16 conveys continuous sheet S fed from sheet feed section 14 to pass continuous sheet S through image forming section 20 (intermediate transfer section 22 and fixing section 30), and conveys continuous sheet S sent from image forming section 20 (fixing section 30) toward sheet discharge section 15.

Continuous sheet S fed from sheet feed section 14 is conveyed to image forming section 20 by recording material conveyance section 16. When continuous sheet S passes through the secondary transfer section, toner images on intermediate transfer belt 221 are collectively transferred onto an image formation face (surface) of continuous sheet S, and fixing processing is performed thereon by fixing section 30. Continuous sheet S on which an image has been formed is discharged to image calibration control unit 1B by sheet discharge section 15.

In image forming apparatus 1, continuous sheet S that has passed through the secondary transfer section is mainly held between fixing nip N1 of fixing section 30 and downstream-side conveyance nip N2 of image calibration control unit 1B, and is conveyed by the rotation of the respective driving rollers, that is, fixing roller 31 and downstream-side driving roller 41.

FIGS. 4A and 4B are diagrams schematically illustrating a configuration of fixing section 30. FIG. 4A illustrates a case where fixing roller 31 is in a reference state in which fixing roller 31 is not thermally expanded, and FIG. 4B illustrates a case where fixing roller 31 is in a thermal expansion state in which fixing roller 31 is thermally expanded. Note that fixing belt 33 is omitted in FIGS. 4A and 4B.

As illustrated in FIGS. 4A and 4B, fixing roller 31 and pressure roller 35 are held in the separated state during non-printing (during cooling). As illustrated in FIG. 4A, in the reference state, the outer diameter of fixing roller 31 is R1, and the separation distance between fixing roller 31 and pressure roller 35 is L1. During printing (including during a warm-up operation before the start of printing), the ambient temperature of fixing section 30 increases, and therefore the elastic layer of fixing roller 31 thermally expands.

As illustrated in FIG. 4B, in the thermal expansion state, the outer diameter of fixing roller 31 is R2, which is larger than outer diameter R1 in the reference state. Furthermore, separation distance L2 between fixing roller 31 and pressure roller 35 is smaller than separation distance L1 in the reference state.

In a case where pressure roller 35 is brought closer to fixing roller 31 and is shifted from the separated state to the pressure-contact state, if a speed at which pressure roller 35 is brought closer (a driving speed of pressure-contact/separation section 36) is identical, the time from the start of the pressure-contact operation of pressure-contact/separation section 36 to the formation of fixing nip N1 having a predetermined width changes depending on the thermal expansion amount of the elastic layer of fixing roller 31. That is, the fixing-side conveyance start timing changes depending on the thermal expansion amount of fixing roller 31.

Further, in a case where a positional relationship between fixing roller 31 and pressure roller 35 in the pressure-contact state (e.g., the distance between roller shafts) is fixed, the nip width of fixing nip N1 changes depending on the thermal expansion amount of the elastic layer of fixing roller 31. Therefore, in a case where pressure roller 35 is moved away from fixing roller 31 to shift from the pressure-contact state to the separated state, if the speed at which pressure roller 35 is moved away from fixing roller 31 (the driving speed of pressure-contact/separation section 36) is identical, the time from the start of the separation operation of pressure-contact/separation section 36 to the release of fixing nip N1 changes depending on the thermal expansion amount of the elastic layer of fixing roller 31. That is, the fixing-side conveyance stop timing changes depending on the thermal expansion amount of fixing roller 31.

In the present embodiment, control section 11 controls the operations of the driving rollers in fixing section 30 and downstream-side conveyance section 40 in a driving aspect according to the thermal expansion amount of the elastic layer of fixing roller 31 based on the detection result of detection section 37. Specifically, control section 11 controls the downstream-side conveyance start timing and the downstream-side conveyance stop timing according to the fixing-side conveyance start timing and the fixing-side conveyance stop timing that change depending on the thermal expansion of fixing roller 31.

Control section 11 controls, for example, a driving start timing when the output to downstream-side driving roller 41 is started and a driving stop timing when the output to downstream-side driving roller 41 is stopped. Control section 11 may control the rising speed at the start of driving downstream-side driving roller 41 and the falling speed at the stop of driving downstream-side driving roller 41 in addition to the driving start timing and driving stop timing of downstream-side driving roller 41 or instead of the driving start timing and driving stop timing of downstream-side driving roller 41.

Detection section 37 measures, for example, the temperature of each part of fixing section 30. In this case, temperature sensors 37*a*, 37*b*, and 37*c* of detection section 37 sense the surface temperature of fixing roller 31, the temperature of the core metal, and the ambient temperature within fixing section 30 (see FIGS. 2 and 3). The thermal expansion amount of fixing roller 31 has a correlation with temperature information such as the surface temperature of fixing roller 31, the temperature of the core metal, and the ambient temperature within fixing section 30. By acquiring the relationship between the temperature of each part of fixing section 30 and the thermal expansion amount of fixing roller 31 in advance, it is possible to evaluate the thermal expansion amount of fixing roller 31 based on the temperature measured by detection section 37 (temperature sensor) disposed in each part of fixing section 30. The method of evaluating the thermal expansion amount based on the temperature of each part in fixing section 30 can be applied to the driving control at the conveyance start when fixing roller 31 and pressure roller 35 are in the separated state and the driving control at the conveyance stop when fixing roller 31 and pressure roller 35 are in the pressure-contact state.

Detection section 37 may measure outer diameter R of fixing roller 31. The amount of change in outer diameter R of fixing roller 31 between during non-printing (during cooling) and immediately before the start of printing (during warm-up operation) is nothing but the thermal expansion amount of fixing roller 31. Furthermore, detection section 37 may measure separation distance L between fixing roller 31 and pressure roller 35. As the thermal expansion amount of fixing roller 31 increases, separation distance L decreases. In these cases, an optical sensor such as a laser displacement meter is applied to detection section 37. The method of evaluating the thermal expansion amount based on outer diameter R of fixing roller 31 or separation distance L between fixing roller 31 and pressure roller 35 is based on the premise that fixing roller 31 and pressure roller 35 are in the separated state, and therefore can be mainly applied to the driving control at the conveyance start.

Further, detection section 37 may measure the driving torque of fixing roller 31 or the driving torque of pressure-contact/separation section 36. In this case, a torque sensor provided in the driving motor of fixing roller 31 or pressure-contact/separation section 36 is applied to detection section 37.

When the pressure-contact operation of pressure-contact/separation section 36 is started in a state where fixing roller 31 is rotated, the driving torque of fixing roller 31 or pressure-contact/separation section 36 greatly fluctuates at a point where fixing roller 31 or pressure roller 35 starts to come into contact with continuous sheet S passed between fixing roller 31 and pressure roller 35. Furthermore, when the separation operation of pressure-contact/separation section 36 is started in a state where fixing roller 31 is rotating, the driving torque of fixing roller 31 or pressure-contact/separation section 36 greatly fluctuates at a point where fixing nip N1 starts to be released. That is, the thermal expansion amount of fixing roller 31 has a correlation with the time from the start of the pressure-contact operation and the start of the separation operation to a fluctuation in the driving torque. The method of evaluating the thermal expansion amount based on the fluctuation of the driving torque can be applied to the driving control at the conveyance start when fixing roller 31 and pressure roller 35 are in the separated state and the driving control at the conveyance stop when fixing roller 31 and pressure roller 35 are in the pressure-contact state.

In the pressure-contact state, as the thermal expansion amount of fixing roller 31 increases, the driving torque of fixing roller 31 and pressure-contact/separation section 36 increases. That is, it can be said that the thermal expansion amount of fixing roller 31 also has a correlation with the measured value of the driving torque. The method of evaluating the thermal expansion amount based on the measured value of the driving torque can be applied to the driving control at the conveyance stop when fixing roller 31 and pressure roller 35 are in the pressed contact state.

The above-described method of evaluating the thermal expansion amount of fixing roller 31 is an example, and any other evaluation method may be applied. For example, the thermal expansion amount of fixing roller 31 can be evaluated based on the tension of fixing belt 33 or the positional fluctuation of a member over which fixing belt 33 is stretched.

In the present embodiment, the fixing-side conveyance start timing and the downstream-side conveyance start timing are made to coincide with each other in consideration of thermal expansion of fixing roller 31, thereby preventing occurrence of abnormal noise due to slack or slip of continuous sheet S. Here, "the fixing-side conveyance start timing and the downstream-side conveyance start timing are made to coincide" is not limited to a case where the timings are strictly made to coincide, and the timings may be made to coincide at least to the extent that no slack occurs in continuous sheet S due to a deviation between timings.

At the conveyance start, no slack occurs in continuous sheet S if the downstream-side conveyance start timing is earlier than the fixing-side conveyance start timing. When the difference between the fixing-side conveyance start timing and the downstream-side conveyance start timing is excessively large, however, continuous sheet S may slip in downstream-side conveyance section 40 to generate abnormal noise. Therefore, the difference between the fixing-side conveyance start timing and the downstream-side conveyance start timing is preferably, for example, 500 msec or less.

Figure 5:
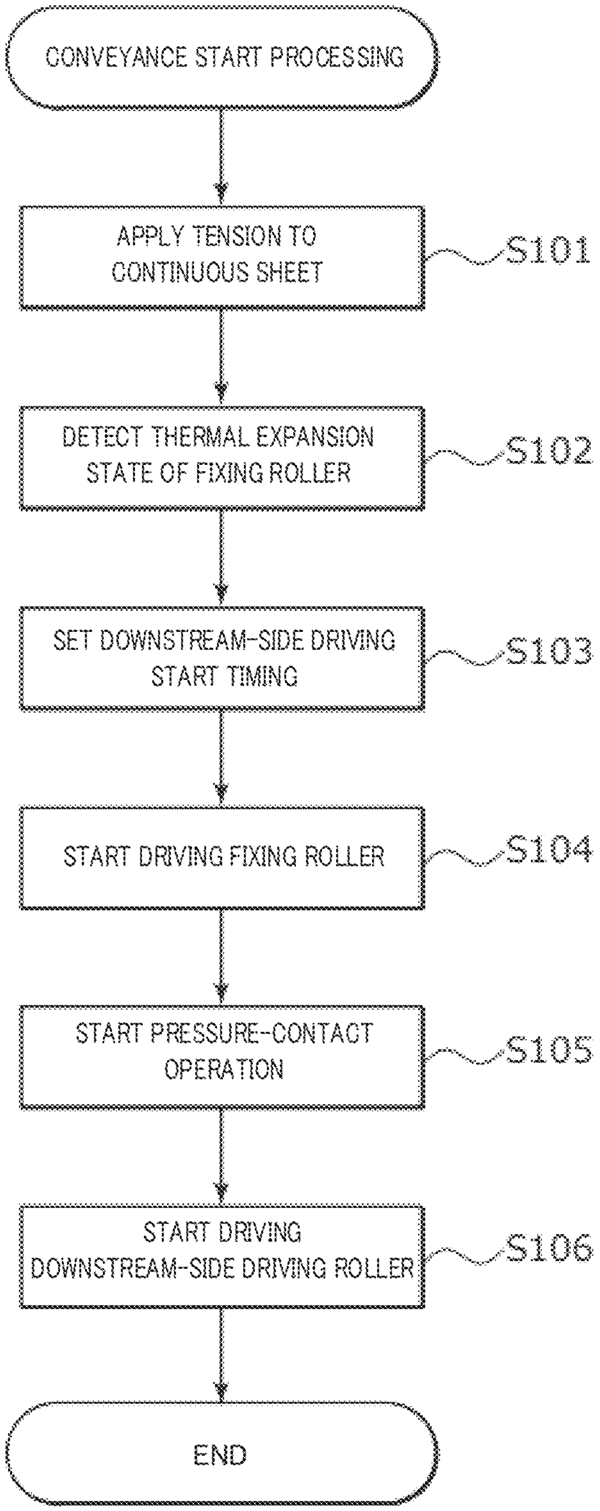
FIG. 5 is a flowchart illustrating an example of conveyance start processing in the image forming apparatus.

FIG. 5 is a flowchart illustrating an example of conveyance start processing in image forming apparatus 1.

This processing is implemented, for example, by CPU 111 executing a predetermined program stored in ROM 112 in response to print data being input to image forming apparatus main body 1A.

It is assumed that fixing roller 31 and pressure roller 35 are held in the separated state during non-printing. Since fixing nip N1 is released in the separated state, tension generated in continuous sheet S is smaller than that during printing. Usually, in the separated state, continuous sheet S is slack in the conveyance path, and the sheet length is longer than the conveyance path length. Further, it is assumed that the driving speed in the pressure-contact operation of pressure-contact/separation section 36, that is, the speed at which pressure roller 35 approaches fixing roller 31, is constant.

In step S101 of FIG. 5, control section 11 applies a predetermined tension to passed continuous sheet S. Control section 11 controls, for example, the operations of sheet feed unit 1C and winding unit 1D to apply tension to continuous sheet S that is slack in the conveyance path. The slack of continuous sheet S is eliminated, and the difference between the sheet length of continuous sheet S passed between fixing nip N1 and downstream-side conveying nip N2 and the conveying path length becomes equal to or less than a predetermined amount (for example, 10 mm).

When conveyance is started in a state where no tension is applied to continuous sheet S, that is, in a state where continuous sheet S is slack, winding around the fixing member (fixing belt 33 in the present embodiment) may occur. In addition, tension generated in continuous sheet S may rapidly change, and abnormal noise may be generated when the slack is eliminated. In the present embodiment, in step S101, the slack of continuous sheet S is eliminated before the conveyance operation of continuous sheet S is started. Therefore, it is possible to prevent winding of continuous sheet S around the fixing member and generation of abnormal noise due to the slack generated in continuous sheet S before the conveyance is started.

By advancing the driving start timing of downstream-side driving roller 41, the slack generated in continuous sheet S may be eliminated before the conveyance operation in fixing section 30 is started.

In step S102, control section 11 detects the thermal expansion state of fixing roller 31. Specifically, control section 11 acquires, from detection section 37, the physical amount related to the thermal expansion state of fixing roller 31.

In step S103, control section 11 sets the driving aspect of downstream-side driving roller 41 in downstream-side conveyance section 40 based on the detection result of detection section 37. Specifically, control section 11 sets the driving start timing of downstream-side driving roller 41 such that the fixing-side conveyance start timing and the downstream-side conveyance start timing, which are predicted based on the thermal expansion state of fixing roller 31 detected in step S102, coincide with each other.

The fixing-side conveyance start timing, the downstream-side conveyance start timing, and the driving start timing of downstream-side driving roller 41 are represented by, for example, the time from the start of the pressure-contact operation of pressure-contact/separation section 36. As the thermal expansion amount of fixing roller 31 increases, the time from the start of the pressure-contact operation of pressure-contact/separation section 36 to the formation of fixing nip N1 having a predetermined width becomes shorter, and the fixing-side conveyance start timing becomes earlier. Therefore, as the thermal expansion amount of fixing roller 31 is larger, it is necessary to advance the downstream-side conveyance start timing, and the driving start timing of downstream-side driving roller 41 is also set to be earlier.

For example, control section 11 sets the driving start timing of downstream-side driving roller 41 such that the downstream-side conveyance start timing is the same as the fixing-side conveyance start timing or slightly earlier than the fixing-side conveyance start timing. In particular, when the driving start timing of downstream-side driving roller 41 is set such that the downstream-side conveyance start timing is earlier than the fixing-side conveyance start timing by 0 to 50 msec, the effect of suppressing winding of continuous sheet S around the fixing member is high.

For example, control section 11 sets the driving start timing of downstream-side driving roller 41 by referring to driving start timing setting data (see FIG. 6) in which the driving start timing of downstream-side driving roller 41 is associated with the thermal expansion state of fixing roller 31. The driving start timing setting data is experimentally obtained in advance and stored in, for example, ROM 112. The driving start timing setting data may be given by function t=f(x) in which index x indicating the thermal expansion state of fixing roller 31 and driving start timing t of downstream-side driving roller 41 are variables.

Figure 6:
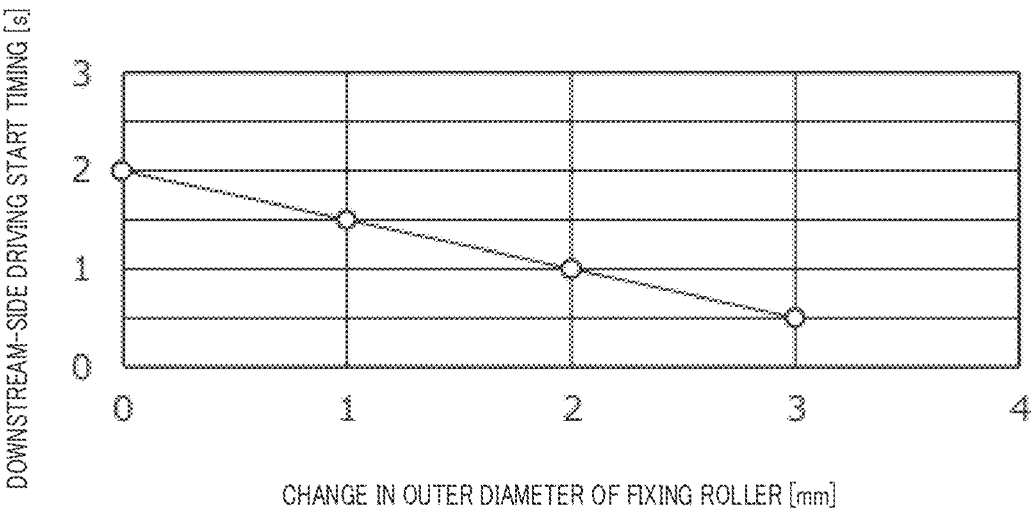
FIG. 6 is a diagram illustrating an example of driving start timing setting data.

FIG. 6 is a diagram illustrating an example of the driving start timing setting data. In FIG. 6, the amount of change in outer diameter R of fixing roller 31 is used as index x indicating the thermal expansion state of fixing roller 31. Note that as index x indicating the thermal expansion state of fixing roller 31, the temperature of each part of fixing section 30, separation distance L between fixing roller 31 and pressure roller 35, the fluctuation timing of the driving torque of fixing roller 31 or pressure-contact/separation section 36, or the like as described above may be used.

According to FIG. 6, for example, in a case where the change in the outer diameter (corresponding to the thermal expansion amount) of fixing roller 31 is 0 mm, the driving start timing of downstream-side driving roller 41 is set to be a value 2 sec after the start of the pressure-contact operation of pressure-contact/separation section 36. Furthermore, for example, in a case where the change in the outer diameter of fixing roller 31 is 3 mm, the driving start timing of downstream-side driving roller 41 is set to be a value 0.5 sec after the start of the pressure-contact operation of pressure-contact/separation section 36.

Control section 11 may control the downstream-side conveyance start timing by fixing the driving start timing of downstream-side driving roller 41 and changing the rising speed of downstream-side driving roller 41. In this case, for example, with reference to the predicted fixing-side conveyance start timing, the rising speed of downstream-side driving roller 41 is controlled such that the driving of downstream-side driving roller 41 is started 500 msec before the fixing-side conveyance start timing and the rotation speed of downstream-side driving roller 41 becomes the set rotation speed 500 msec after the fixing-side conveyance start timing. Thus, since it is possible to maintain an appropriate tension state without causing the tensile force with respect to continuous sheet S in downstream-side conveyance section 40 to too strong from the initial stage of driving, it is possible to suppress the winding of continuous sheet S around the fixing member while suppressing the occurrence of abnormal noise due to slip.

Instep S104 of FIG. 4, control section 11 starts driving fixing roller 31. Fixing roller 31 rotates at a constant rotation speed.

In step S105, control section 11 starts the pressure-contact operation of pressure-contact/separation section 36. Pressure roller 35 approaches fixing roller 31 at a constant speed, and fixing nip N1 is formed. When fixing nip N1 having a predetermined width is formed, the conveyance of continuous sheet S is started. The pressure-contact operation of pressure-contact/separation section 36 is stopped, for example, with the arrival of pressure roller 35 at a preset position. Fixing roller 31 and pressure roller 35 are held in a state of being in pressure contact with each other with a predetermined pressure contact force.

In step S106, control section 11 starts driving downstream-side driving roller 41 at the driving start timing set in step S103. The driving start timing of downstream-side driving roller 41 is set such that the fixing-side conveyance start timing in fixing section 30 and the downstream-side conveyance start timing in downstream-side conveyance section 40 coincide with each other. Therefore, the conveyance of continuous sheet S is simultaneously started at fixing section 30 and downstream-side conveyance section 40. No slack occurs in continuous sheet S due to a deviation between the fixing-side conveyance start timing and the downstream-side conveyance start timing, and no failure occurs in which continuous sheet S winds around the fixing member (fixing belt 33). Further, no slip noise due to a deviation between the fixing-side conveyance start timing and the downstream-side conveyance start timing occurs, either.

Note that the processing in steps S102 and S103 may only be executed before fixing nip N1 having a predetermined width is formed and continuous sheet S starts to be conveyed. The processing in steps S102 and S103 may be executed, for example, after the driving of fixing roller 31 is started in step S104, or may be executed after the pressure-contact operation of pressure-contact/separation section 36 is started in step S105.

In a case where the driving start timing of downstream-side driving roller 41 is set by predicting the fixing-side conveyance start timing based on outer diameter R of fixing roller 31 and separation distance L between fixing roller 31 and pressure roller 35, however, the detection processing in step S102 is preferably executed before the start of driving fixing roller 31 in step S104 in order to enhance the measurement accuracy. Further, in a case where the driving start timing of downstream-side driving roller 41 is set by predicting the fixing-side conveyance start timing based on the driving torque of fixing roller 31 or pressure-contact/separation section 36, the processing in steps S102 and S103 is executed after step S105.

Further, in the present embodiment, the fixing-side conveyance stop timing and the downstream-side conveyance stop timing are made to coincide with each other in consideration of thermal expansion of fixing roller 31, thereby preventing occurrence of abnormal noise due to slack or slip of continuous sheet S. "The fixing-side conveyance stop timing and the downstream-side conveyance stop timing are made to coincide" is not limited to a case where the timings are strictly made to coincide, and the timings may be made to coincide at least to the extent that no slack occurs in continuous sheet S due to a deviation between timings.

At the conveyance stop, if the downstream-side conveyance stop timing is later than the fixing-side conveyance stop timing, however, no slack occurs in continuous sheet S. When the difference between the fixing-side conveyance stop timing and the downstream-side conveyance stop timing is excessively large, continuous sheet S may slip in downstream-side conveyance section 40 to generate abnormal noise. Therefore, the difference between the fixing-side conveyance stop timing and the downstream-side conveyance stop timing is preferably, for example, 500 msec or less.

Figure 7:
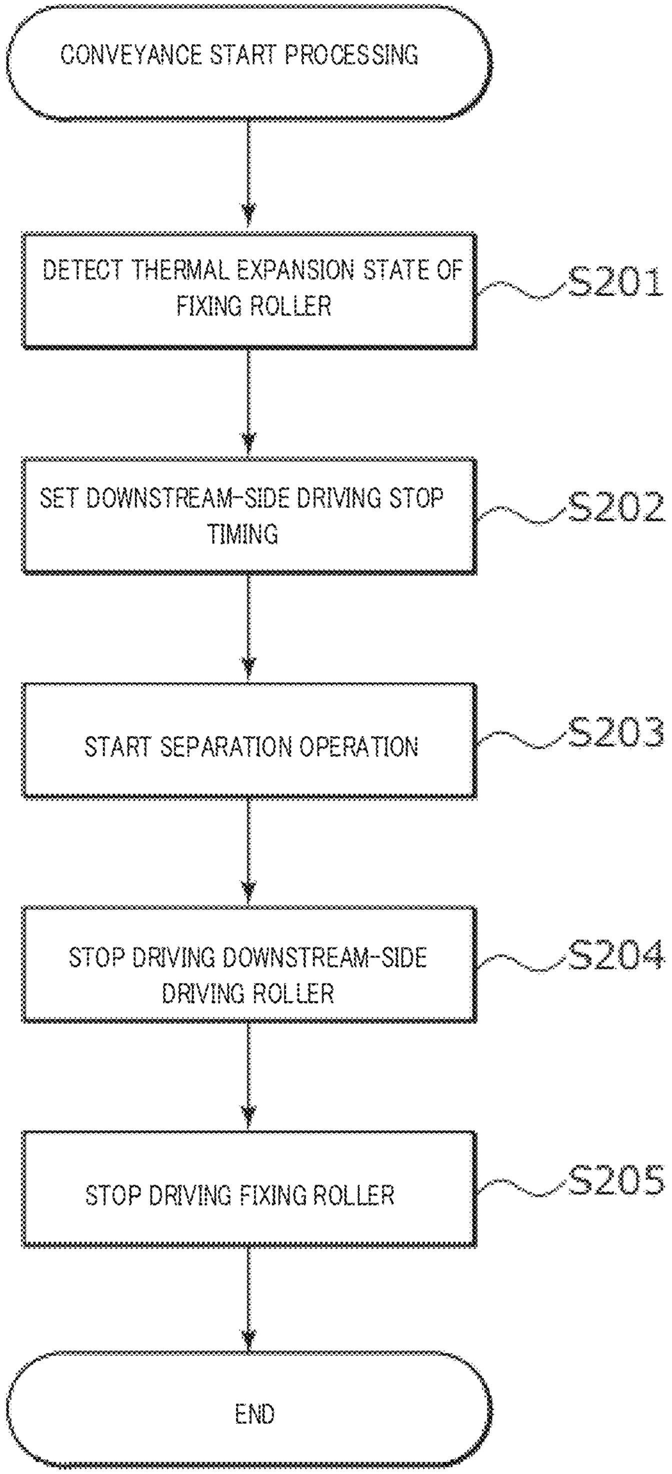
FIG. 7 is a flowchart illustrating an example of conveyance stop processing in the image forming apparatus.

FIG. 7 is a flowchart illustrating an example of conveyance stop processing in image forming apparatus 1. This processing is implemented, for example, by CPU 111 executing a predetermined program stored in ROM 112 in response to the end of the print processing based on print data.

It is assumed that the driving speed in the separation operation of pressure-contact/separation section 36, that is, the speed at which pressure roller 35 is separated from fixing roller 31, is constant.

Instep S201 of FIG. 7, control section 11 detects the thermal expansion state of fixing roller 31. Specifically, control section 11 acquires, from detection section 37, the physical amount related to the thermal expansion state of fixing roller 31. Ina case where the thermal expansion state of fixing roller 31 at the conveyance stop can be regarded as equivalent to the thermal expansion state of fixing roller 31 at the conveyance start, the thermal expansion state detected at the conveyance start may be stored and used at the conveyance stop.

In step S202, control section 11 sets the driving aspect of downstream-side driving roller 41 in downstream-side conveyance section 40 based on the detection result of detection section 37. Specifically, control section 11 sets the driving stop timing of downstream-side driving roller 41 such that the fixing-side conveyance stop timing and the downstream-side conveyance stop timing, which are predicted based on the thermal expansion state of fixing roller 31 detected in step S201, coincide with each other.

The fixing-side conveyance stop timing, the downstream-side conveyance stop timing, and the driving stop timing of downstream-side driving roller 41 are represented by, for example, the time from the start of the separation operation of pressure-contact/separation section 36. As the thermal expansion amount of fixing roller 31 increases, the nip length of fixing nip N1 having been formed increases, so that the time from the start of the separation operation of pressure-contact/separation section 36 to the release of fixing nip N1 increases, and the fixing-side conveyance stop timing becomes later. Therefore, as the thermal expansion amount of fixing roller 31 increases, it is necessary to delay the downstream-side conveyance stop timing, and the driving stop timing of downstream-side driving roller 41 is also set to be delayed.

For example, control section 11 sets the driving stop timing of downstream-side driving roller 41 such that the downstream-side conveyance stop timing is the same as the fixing-side conveyance stop timing or slightly later than the fixing-side conveyance stop timing. In particular, when the driving start timing of downstream-side driving roller 41 is set such that the downstream-side conveyance start timing is earlier than the fixing-side conveyance start timing by 0 to 50 msec, the effect of suppressing winding of continuous sheet S around the fixing member is high.

For example, control section 11 sets the driving stop timing of downstream-side driving roller 41 by referring to driving stop timing setting data (see FIG. 8) in which the driving stop timing of downstream-side driving roller 41 is associated with the thermal expansion state of fixing roller 31. The driving stop timing setting data is experimentally obtained in advance and stored in, for example, ROM 112. The driving stop timing setting data may be given by function t=f(x) in which index x indicating the thermal expansion state of fixing roller 31 and driving stop timing t of downstream-side driving roller 41 are variables.

Figure 8:
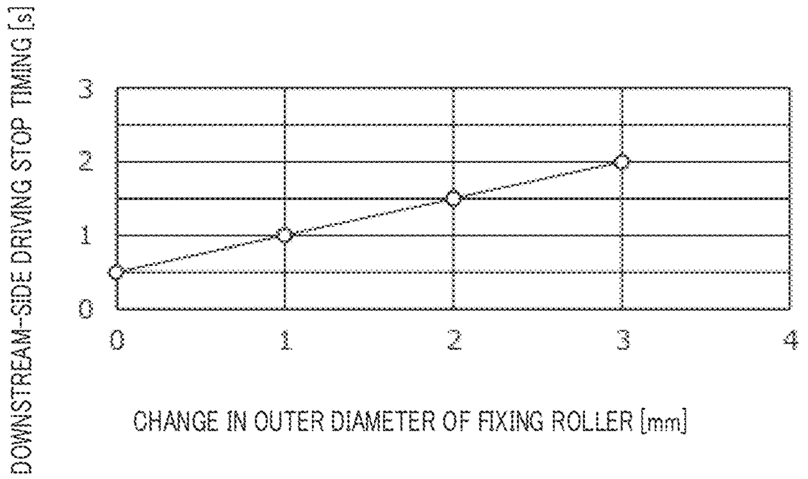
FIG. 8 is a diagram illustrating an example of driving stop timing setting data.

FIG. 8 is a diagram illustrating an example of the driving stop timing setting data. In FIG. 8, the amount of change in outer diameter R of fixing roller 31 is used as index x indicating the thermal expansion state of fixing roller 31. Note that as index x indicating the thermal expansion state of fixing roller 31, the temperature of each part of fixing section 30, separation distance L between fixing roller 31 and pressure roller 35, the fluctuation timing of the driving torque of fixing roller 31 or pressure-contact/separation section 36, or the like as described above may be used.

According to FIG. 8, for example, in a case where the change in the outer diameter of fixing roller 31 (corresponding to the thermal expansion amount) is 0 mm, the driving stop timing of downstream-side driving roller 41 is set to be a value 0.5 sec after the start of the separation operation of pressure-contact/separation section 36. Further, for example, in a case where the change in the outer diameter of fixing roller 31 is 3 mm, the driving start timing of downstream-side driving roller 41 is set to be a value 2 sec after the start of the separation operation of pressure-contact/separation section 36.

Note that, similarly to the conveyance start, control section 11 may control the downstream-side conveyance stop timing by fixing the driving stop timing of downstream-side driving roller 41 and changing the falling speed of downstream-side driving roller 41. Thus, since it is possible to maintain an appropriate tension state without rapidly decreasing the tensile force with respect to continuous sheet S in downstream-side conveyance section 40, it is possible to suppress the winding of continuous sheet S around the fixing member while suppressing the occurrence of abnormal noise due to slip.

Instep S203 of FIG. 7, control section 11 starts the separation operation of pressure-contact/separation section 36. Pressure roller 35 moves away from fixing roller 31 at a constant speed, and fixing nip N1 is released. When the nip width of fixing nip N1 becomes equal to or less than the predetermined value, the conveyance of continuous sheet S is stopped. The separation operation of pressure-contact/separation section 36 is stopped at a time point when pressure roller 35 returns to the initial state.

Instep S204, control section 11 stops driving downstream-side driving roller 41 at the driving stopping timing set in step S202. The driving stop timing of downstream-side driving roller 41 is set such that the fixing-side conveyance stop timing in fixing section 30 and the downstream-side conveyance stop timing in downstream-side conveyance section 40 coincide with each other. Therefore, the conveyance of continuous sheet S is simultaneously stopped at fixing section 30 and downstream-side conveyance section 40. Since no slack occurs in continuous sheet S due to a deviation between the fixing-side conveyance stop timing and the downstream-side conveyance stop timing, a failure in which continuous sheet S winds around fixing belt 33 does not occur, either. Further, no slip noise due to a deviation between the fixing-side conveyance stop timing and the downstream-side conveyance stop timing occurs, either.

In step S205, control section 11 stops driving fixing roller 31. The stop timing of fixing roller 31 is not particularly limited as long as it is after fixing roller 31 and pressure roller 35 are separated from each other.

[Variations]

Although the driving aspect in the downstream-side conveyance section is controlled according to the thermal expansion state of fixing roller 31 in the above-described embodiment, a failure such as the winding of continuous sheet S around the fixing member is also influenced by factors other than the thermal expansion state of fixing roller 31.

In one example, the likelihood of winding of continuous sheet S around the fixing member and the likelihood of occurrence of abnormal noise due to slip vary depending on media information of continuous sheet So to be passed. Therefore, in addition to the thermal expansion state of fixing roller 31, it is preferable to control the drive mode in downstream-side conveyance section 40 based on the media information of continuous sheet S. The "media information" is information indicating the type of continuous sheet S, and includes, for example, at least one of the material, the melting point, the sheet thickness, the basis weight, the stiffness, and/or the friction coefficient of continuous sheet S.

For example, in a case where the fixing surface of continuous sheet S is formed of polypropylene (PP) having a low melting point, winding around the fixing member is more likely to occur than in a case where the fixing surface is formed of a material having a higher melting point than PP. Therefore, as compared with the case of using continuous sheet S formed of the material having the melting point higher than that of PP, it is preferable to set the driving start timing of downstream-side driving roller 41 earlier so that the slack is less likely to occur in continuous sheet S. The same applies to the control of the driving stop timing of downstream-side driving roller 41 at the conveyance stop.

Furthermore, for example, since the conveyance load changes depending on the sheet thickness, the basis weight, or the stiffness of continuous sheet S, the fixing-side conveyance start timing and the fixing-side conveyance stop timing change even if the thermal expansion state of fixing roller 31 is the same. Taking the sheet thickness as an example, the conveyance load becomes greater mainly due to the bend in the conveyance path in a case where the sheet thickness is greater, and therefore, the fixing-side conveyance start timing becomes later and the fixing-side conveyance stop timing becomes earlier. Therefore, it is preferable to change the driving start timing of downstream-side driving roller 41 for each sheet thickness. The same applies to the control of the driving stop timing of downstream-side driving roller 41 at the conveyance stop.

In the case of controlling the driving start timing and the driving stop timing of downstream-side driving roller 41 based on the media information of continuous sheet S, the driving start timing setting data (see FIG. 6) and the driving stop timing setting data (see FIG. 8) are prepared in association with the media information.

Figure 9:
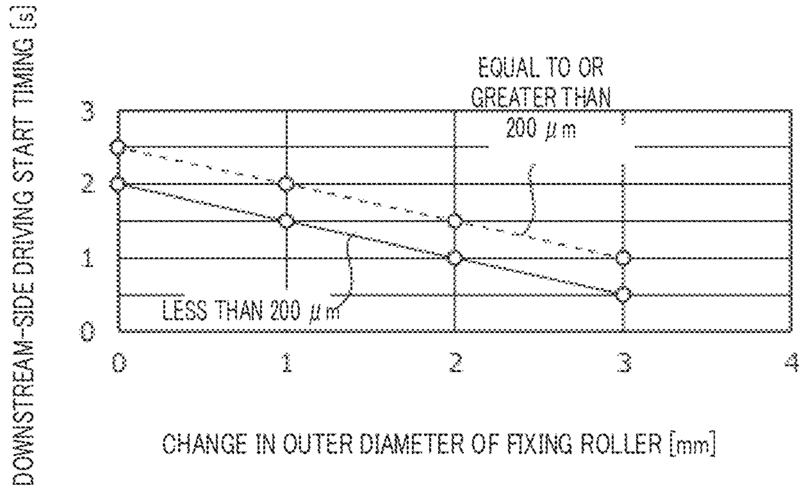
FIG. 9 is a diagram illustrating an example of the driving start timing setting data prepared for each sheet thickness.

FIG. 9 is a diagram illustrating an example of the driving start timing setting data prepared for each sheet thickness. In FIG. 9, the amount of change in outer diameter R of fixing roller 31 is used as index x indicating the thermal expansion state of fixing roller 31.

According to FIG. 9, in a case where the sheet thickness is equal to or greater than 200 μm, the driving start timing of downstream-side driving roller 41 is set to be a value later by 0.5 sec than a case where the sheet thickness is less than 200 μm. Since the driving start timing of downstream-side driving roller 41 is appropriately controlled according to the sheet thickness of continuous sheet S, even if the fixing-side conveyance start timing changes due to the sheet thickness, the downstream-side conveyance start timing can be accurately made to coincide.

The media information of continuous sheet S can be acquired, for example, based on a user operation in operation section 122. For example, as the media information of continuous sheet S, items such as the material, the sheet thickness, and the basis weight may be presented on display section 121 so that the user can select each item from a plurality of options.

In addition, the media information of continuous sheet S may be acquired by a media information detection section 17 (see FIG. 3) provided inside or outside image forming apparatus 1. As the medium information detection section, for example, a basis weight detection sensor using laser or a contact type displacement sensor which detects the sheet thickness by holding continuous sheet S between a pair of metals such as vernier calipers can be applied.

Figure 5A:
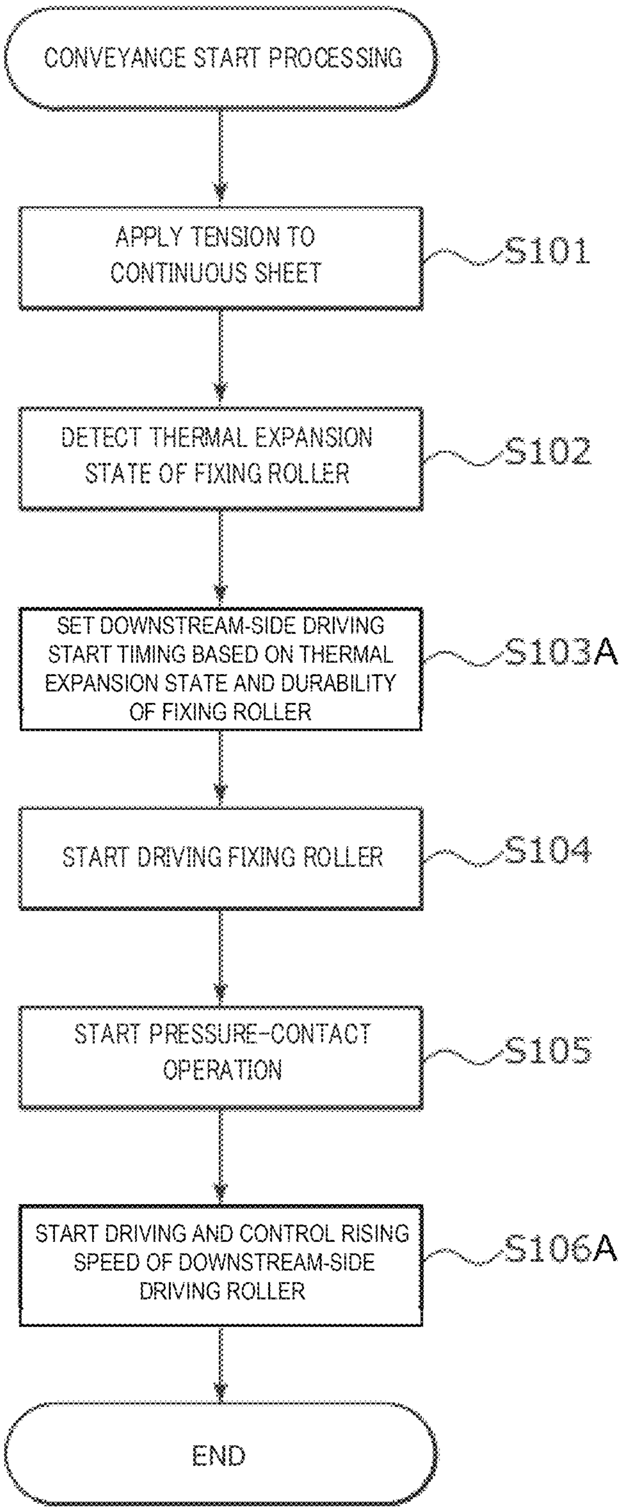
FIG. 5A is a flowchart illustrating another example of conveyance start processing in the image forming apparatus.
Figure 7A:
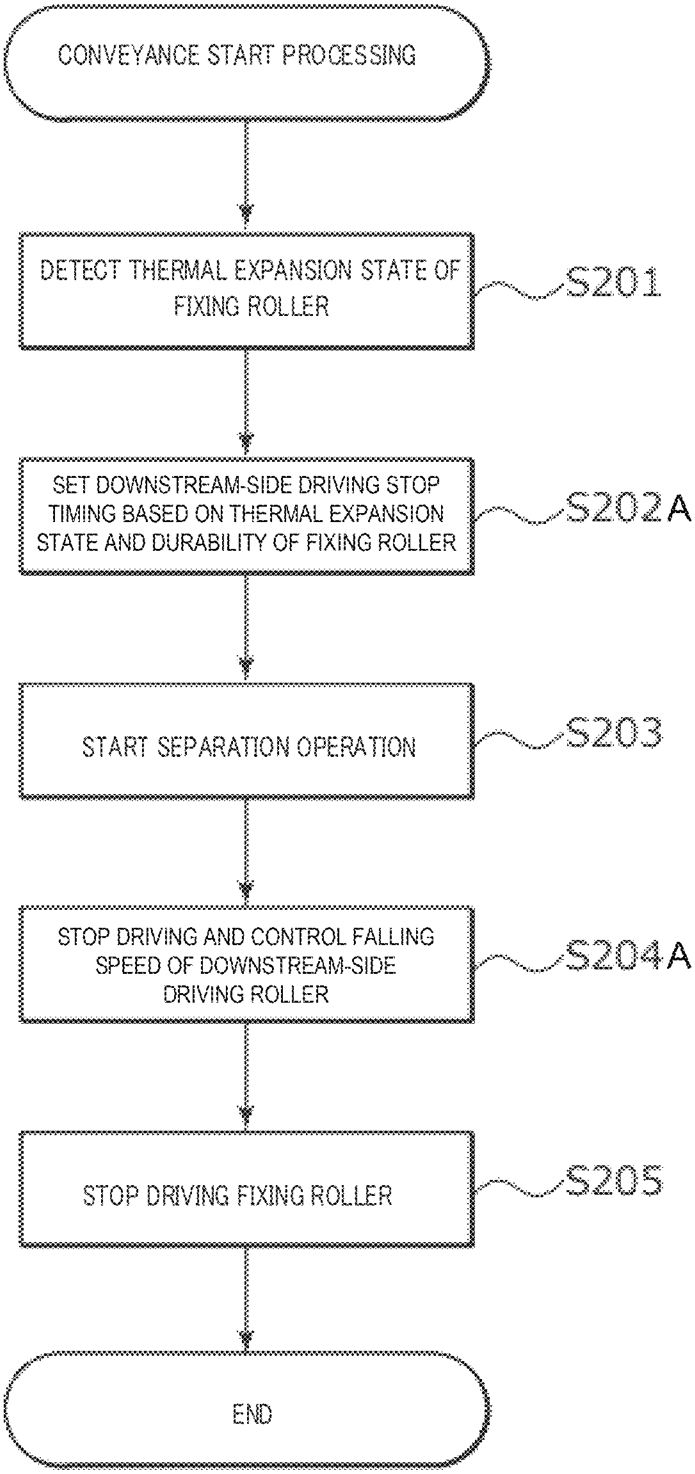
FIG. 7A is a flowchart illustrating another example of conveyance stop processing in the image forming apparatus.

FIGS. 5A and 7A show embodiment similar to FIGS. 5 and 7. Only steps 103A, 106A, 202A, and 204A are different. Steps S103A and S202A for setting the downstream-side driving start timing and stop timing include varying the fixing-side conveyance start timing and the fixing-side conveyance stop timing depending on the durability of the fixing member (for example, fixing roller 31). Similarly, steps S103A and S202A may include varying the downstream-side conveyance start timing and the downstream-side conveyance stop timing depending on the durability of the downstream-side conveyance member (for example, downstream-side driving roller 41). Therefore, it is preferable to correct the driving start timing and the downstream driving stop timing of downstream-side driving roller 41 according to the durability of the fixing member and the downstream-side conveyance member.

In particular, since the outer diameter of the fixing member likely to change due to the thermal load and repeated compression, the durability of the fixing member should be taken into consideration in performing the driving control of fixing section 30 and downstream-side conveyance section 40. When the durability of fixing roller 31 is taken into consideration, in the same way of thinking as the thermal expansion state of fixing roller 31, the fixing-side conveyance start timing is delayed and the fixing-side conveyance stop timing is advanced by an amount by which outer diameter R becomes smaller than in the initial stage of durability in which there is no change in the outer diameter.

Figure 10:
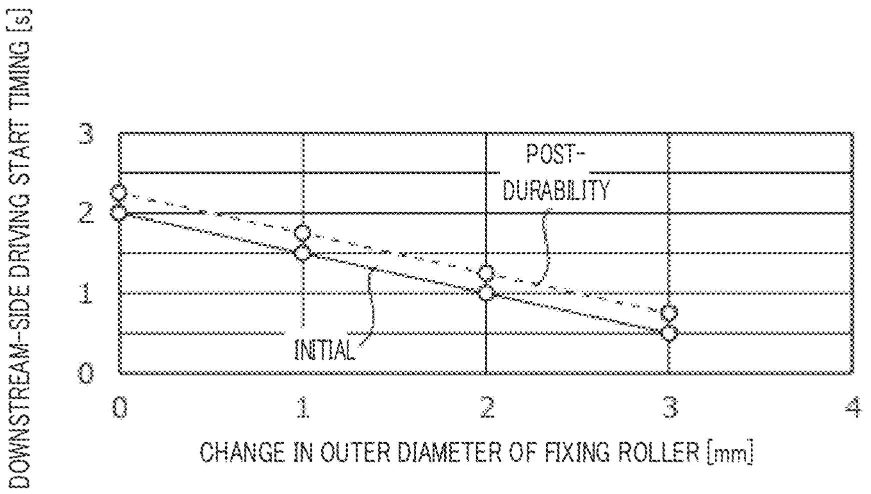
FIG. 10 is a diagram illustrating an example of the driving start timing setting data corrected in consideration of durability.

FIG. 10 is a diagram illustrating an example of the driving start timing setting data corrected in consideration of durability. In FIG. 10, the amount of change in outer diameter R of fixing roller 31 is used as index x indicating the thermal expansion state of fixing roller 31. FIG. 10 illustrates an initial stage of durability of fixing roller 31 due to durability and a post-durability stage in which outer diameter R of fixing roller 31 becomes smaller by 0.4 mm due to durability.

Here, the correction amount with respect to the durability of fixing roller 31 (in the example illustrated in FIG. 10, the correction amount of 0.2 sec with respect to the change in the outer diameter of −0.4 mm) may be experimentally obtained in advance and stored in, for example, ROM 112.

Figure 11:
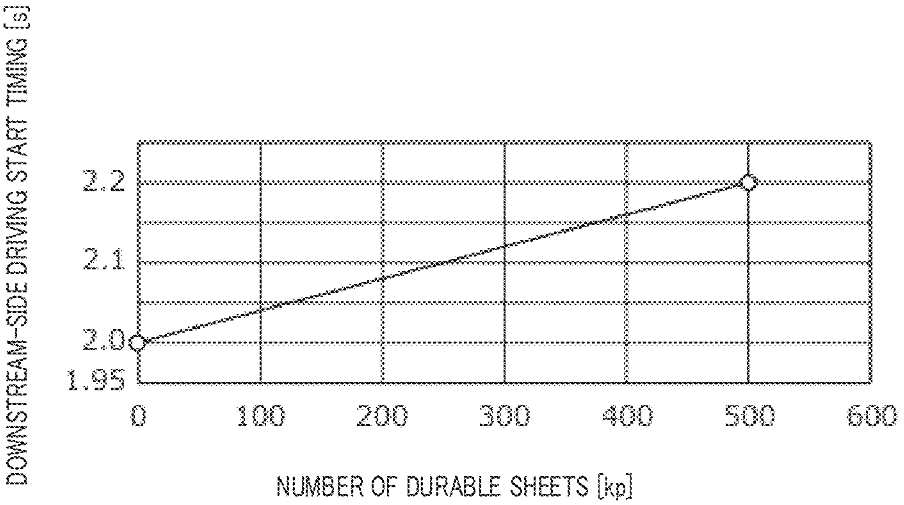
FIG. 11 is a diagram illustrating an example of the driving start timing setting data with respect to the durability of a fixing roller.

FIG. 11 is a diagram illustrating an example of the driving start timing setting data with respect to the durability of fixing roller 31. FIG. 11 uses the number of durable sheets (durability time) as an index indicating the durability of fixing roller 31. According to FIG. 11, when the number of durable sheets is 500 kp, the correction amount is 0.2 sec.

That is, FIGS. 10 and 11 illustrate that in a case where the number of durable sheets is 500 kp, outer diameter R of fixing roller 31 is reduced by 0.4 mm and it is sufficient to delay the timing by 0.2 sec compared with the driving start timing at the initial stage of durability. Since the driving start timing of downstream-side driving roller 41 is appropriately controlled according to the durability of the fixing member and the like, even if the fixing-side conveyance start timing changes due to the sheet thickness, the downstream-side conveyance start timing can be accurately coincided. The same applies to the control of the driving stop timing of downstream-side driving roller 41 at the conveyance stop.

Note that the correction amount for durability may be appropriately set on the basis of a difference between the fixing-side conveyance start timing predicted on the basis of the thermal expansion state of fixing roller 31 and the timing at which continuous sheet S actually starts to move by comparison therebetween. For example, a mechanism capable of detecting the conveyspeed of continuous sheet S may be disposed in fixing section 30 so that the timing at which continuous sheet S actually starts to move can be detected. In this case, since the correction is performed in consideration of not only the deterioration of fixing roller 31 but also variations in the members, it is possible to further optimize the fixing-side conveyance start timing and the downstream-side conveyance start timing.

As described above, image forming apparatus 1 according to the present embodiment includes the following features singly or in combination as appropriate.

That is, image forming apparatus 1 is an image forming apparatus capable of printing on continuous sheet S and includes: fixing section 30 that fixes an image on an unfixed surface of continuous sheet S while conveying continuous sheet S by fixing nip N1; downstream-side conveyance section 40 that is disposed on a downstream side of fixing section 30 in a sheet conveyance direction and conveys continuous sheet S by downstream-side conveyance nip N2; detection section 37 that detects a physical amount related to a thermal expansion state of fixing roller 31 (fixing member) that forms fixing nip N1; and control section 11 that controls a driving aspect of at least one of fixing section 30 and/or downstream-side conveyance section 40 based on a detection result by detection section 37.

Further, the conveyance method according to the embodiment is a conveyance method in image forming apparatus 1 capable of printing on continuous sheet S, and the conveyance method includes: conveying continuous sheet S by fixing nip N1 that fixes an image on an unfixed side of continuous sheet S (steps S104 and S105 in FIG. 5, and steps S203 and S205 in FIG. 7); conveying continuous sheet S by downstream-side conveyance nip N2 disposed on a downstream side of fixing nip N1 in the sheet conveyance direction (steps S106 and S204); detecting a physical amount related to a thermal expansion state of fixing roller 31 (fixing member) that forms fixing nip N1 (steps S102 and S201); and controlling a driving aspect of at least one of fixing section 30, in which fixing nip N1 is disposed, and/or downstream-side conveyance section 40, in which downstream-side conveyance nip N2 is disposed (steps S103 and S202), based on the detected physical amount related to the thermal expansion state.

Furthermore, in the embodiment, image forming apparatus 1 according to the present invention is implemented by control section 11 of image forming apparatus 1 executing a program. That is, the program according to the embodiment includes a program that causes control section 11 (computer) of image forming apparatus 1 capable of printing on continuous sheet S to execute predetermined processing, and the predetermined processing includes: conveying continuous sheet S by fixing nip N1 that fixes an image on an unfixed side of continuous sheet S (steps S104 and S105 in FIG. 5 and steps S203 and S205 in FIG. 7); conveying continuous sheet S by downstream-side conveyance nip N2 disposed on a downstream side of fixing nip N1 in the sheet conveyance direction (steps S106 and S204); detecting a physical amount related to a thermal expansion state of fixing roller 31 (fixing member) forming fixing nip N1 (steps S102 and S201), and processing of controlling a driving aspect of at least one of fixing section 30, in which fixing nip N1 is disposed, and/or downstream-side conveyance section 40, in which downstream-side conveyance nip N2 is disposed, based on the detected physical amount related to the thermal expansion state (steps S103 and S202).

The program can be provided, for example, via a computer-readable portable storage medium (including, for example, an optical disc, a magneto-optical disk, and a memory card) in which the program is stored. Furthermore, for example, the program can be provided by being downloaded from a server that holds the program via a network.

According to image forming apparatus 1, the conveyance method, and the program according to the embodiment, even when fixing roller 31 is thermally expanded, the conveyance start and the conveyance stop of continuous sheet S are simultaneously performed at fixing section 30 and downstream-side conveyance section 40. Since no slack occurs in continuous sheet S due to a deviation between the fixing-side conveyance start timing and the downstream-side conveyance start timing and a deviation between the fixing-side conveyance stop timing and the downstream-side conveyance stop timing, a failure in which continuous sheet S winds around fixing belt 33 does not occur, either. Further, no slip noise due to a deviation between the fixing-side conveyance stop timing and the downstream-side conveyance stop timing occurs, either. Accordingly, it is possible to appropriately convey continuous sheet S by preventing a failure such as slack which may occur in continuous sheet S at the conveyance start and at the conveyance stop. In addition, it is possible to eliminate the need for a mechanism such as a tension roller that applies tension to continuous sheet S to eliminate slack in continuous sheet S.

In image forming apparatus 1, fixing section 30 includes pressure contact/separation section 36 that brings fixing roller 31 and pressure roller 35 (fixing member) into pressure contact with each other and that separates fixing roller 31 and pressure roller 35 from each other, and control section 11 shifts, at a conveyance start, fixing roller 31 from the separated state to the pressure-contact state while driving fixing roller 31, and shifts, at a conveyance stop, fixing roller 31 from the pressure-contact state to the separated state while driving fixing roller 31. In this way, in a case where the change in the fixing-side conveyance start timing and the fixing-side conveyance stop timing due to the thermal expansion state of fixing roller 31 is significant, it is possible to appropriately convey continuous sheet S by preventing a failure such as slack which may occur in continuous sheet S at the conveyance start and at the conveyance stop.

In image forming apparatus 1, step S105 may be performed by the control section 11 shifting, at the conveyance start, from the separated state to the pressure-contact state after a difference between a sheet length of continuous sheet S, which is passed between fixing nip N1 and downstream-side conveyance nip N2, and a conveyance path length becomes equal to or less than a predetermined amount. Since the slack of continuous sheet S is eliminated before the conveyance operation of continuous sheet S is started, it is possible to prevent continuous sheet S from being wound around the fixing member or generating abnormal noise due to the slack generated in continuous sheet S before the conveyance is started.

In image forming apparatus 1, control section 11 controls a driving start timing or a driving stop timing of downstream-side driving roller 41 (conveyance member) in downstream-side conveyance section 40. Specifically, as the thermal expansion amount of fixing roller 31 (fixing member) increases, control section 11 controls the driving start timing of downstream-side driving roller 41 (conveyance member) in downstream-side conveyance section 40 to be earlier and controls the driving stop timing to be later. Thus, it is possible to facilitate the control to make the conveyance timing in fixing section 30 and the conveyance timing in downstream-side conveyance section 40 to coincide with each other.

Further, in image forming apparatus 1, steps S106A and S204A in FIGS. 5A and 7A may be performed by the control section 11 controlling the driving speeds of downstream-side driving roller 41 (conveyance member) in downstream-side conveyance section 40 at the conveyance start and at the conveyance stop. Specifically, control section 11 controls the rising speed of downstream-side driving roller 41 (conveyance member) in downstream-side conveyance section 40 faster in step S106A and controls the falling speed of downstream-side driving roller 41 (conveyance member) in downstream-side conveyance section 40 slower in step S204A as the thermal expansion amount of fixing roller 31 (fixing member) is larger. Thus, it is possible to facilitate the control of making the conveyance timing in fixing section 30 and the conveyance timing in downstream-side conveyance section 40 to coincide with each other.

In image forming apparatus 1, detection section 37 detects the temperature of each part of fixing section 30. Thus, the thermal expansion state of fixing roller 31 can be easily detected based on the temperature of each part of fixing section 30.

In image forming apparatus 1, detection section 37 detects outer diameter R of fixing roller 31 (fixing member). Further, in image forming apparatus 1, detection section 37 may detect a separation distance between fixing roller 31 and pressing roller 35 (two fixing members) that form fixing nip N1. Thus, the thermal expansion state of fixing roller 31 can be directly and accurately detected.

In image forming apparatus 1, detection section 37 further includes a sensor 37*d* that detects the driving torque of fixing roller 31 (fixing member) or the driving torque of pressure-contact/separation section 36. Thus, it is possible to detect the thermal expansion state of fixing roller 31 by using the torque detection device provided in the driving motor of fixing roller 31 or the driving motor of pressure-contact/separation section 36 without providing a special detection apparatus.

In image forming apparatus 1, control section 11 controls the driving aspect such that a conveyance start timing in downstream-side conveyance section 40 is identical to or earlier than a conveyance start timing in fixing section 30. Thus, it is possible to reliably avoid winding of continuous sheet S around the fixing member that may occur at the conveyance start.

In image forming apparatus 1, control section 11 controls the driving aspect such that a conveyance stop timing in downstream-side conveyance section 40 is identical to or later than a conveyance stop timing in fixing section 30. Thus, it is possible to surely avoid winding of continuous sheet S around the fixing member, which may occur when conveyance is stopped.

In image forming apparatus 1, control section 11 may control the driving aspect of fixing section 30 and the driving aspect of downstream-side conveyance section 40 based on media information of continuous sheet S in use in addition to the detection result. Specifically, the media information includes at least one of the material, the melting point, the thickness, the basis weight, the stiffness, and/or the friction coefficient of continuous sheet S. Image forming apparatus 1 may include a media information detection section that detects a physical property of continuous sheet S as the media information. Thus, the conveyance timing in fixing section 30 and the conveyance timing in downstream-side conveyance section 40 can be made to coincide in consideration of the ease of the conveyance of continuous sheet S, and continuous sheet S can be conveyed more appropriately.

In image forming apparatus 1, control section 11 preferably corrects, according to durability of fixing section 30 and durability of downstream-side conveyance section 40, the driving aspect controlled based on the detection result. Further, control section 11 preferably sets a correction amount by comparing the driving aspect controlled based on the detection result with an actual driving aspect. Thus, the conveyance timing in fixing section 30 and the conveyance timing in downstream-side conveyance section 40 can be made to coincide in consideration of the durability of image forming apparatus 1, and continuous sheet S can be more appropriately conveyed.

Although the invention made by the present inventors has been specifically described above based on an embodiment, the present invention is not limited to the above-described embodiment, and modifications can be made without departing from the spirit and scope of the present invention.

For example, in the embodiment, as the driving aspect of fixing section 30 and downstream-side conveyance section 40, the case where the driving timing of downstream-side driving roller 41 is controlled has been described, but the driving timing of fixing roller 31 may be controlled with the driving timing of downstream-side driving roller 41 fixed, or the driving speed of pressure-contact/separation section 36 may be controlled.

Furthermore, although the case where fixing roller 31 and pressure roller 35 are in pressure contact with each other and separated from each other in fixing section 30 has been described in the embodiment, fixing roller 31 and pressure roller 35 may be constantly in pressure contact with each other. Also in this case, the timings of the conveyance start and the conveyance stop may vary depending on the thermal expansion state of fixing roller 31, and therefore the present invention can be applied.

Furthermore, in the embodiment, the case has been described where the driving aspects of fixing section 30 and downstream-side conveyance section 40 are controlled according to the thermal expansion state of fixing roller 31, but the driving aspects of fixing section 30 and downstream-side conveyance section 40 may be controlled in consideration of the thermal expansion states of fixing members (e.g., heating roller 32, fixing belt 33, and pressure roller 35) other than fixing roller 31.

Further, the present invention can be applied to conveyance control of continuous sheet in a monochrome image forming apparatus.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image forming apparatus capable of printing on continuous sheet, the image forming apparatus comprising:

a fixing section that fixes an image on an unfixed surface of the continuous sheet while conveying the continuous sheet by a fixing nip, wherein the fixing section includes a pressure-contact/separation section that brings fixing members that form the fixing nip into pressure contact with each other and that separates the plurality of fixing members from each other;

a downstream-side conveyance section that is disposed on a downstream side of the fixing section in a sheet conveyance direction and conveys the continuous sheet by a downstream-side conveyance nip;

a detection section that detects a physical amount related to a thermal expansion state of a fixing member of the fixing members that form the fixing nip; and a control section that controls a driving aspect of at least one of the fixing section and/or the downstream-side conveyance section based on a detection result by the detection section, wherein a driving start timing of a conveyance member in the downstream-side conveyance section is set to be a time after a start of a pressure-contact operation of the pressure-contact/separation section and a driving stop timing of the conveyance member in the downstream-side conveyance section is set to be a time after a start of a separation operation of the pressure-contact/separation section, and the control section performs an adjustment of the driving start timing of the conveyance member in the downstream-side conveyance section to an earlier time after the start of the pressure-contact operation as the physical amount indicates that a thermal expansion amount of the fixing member increases, an adjustment of the driving stop timing of the conveyance member in the downstream-side conveyance section to a later time after the start of the separation operation as the physical amount indicates that a thermal expansion amount of the fixing member increases, or both.

2. The image forming apparatus according to claim 1, wherein:

the control section shifts, at a conveyance start, one of the plurality of fixing members from a separated state to a pressure-contact state while driving the one of the plurality of fixing members, and shifts, at a conveyance stop, the one of the plurality of fixing members from the pressure-contact state to the separated state while driving the one of the plurality of fixing members.

3. The image forming apparatus according to claim 2, wherein the control section shifts, at the conveyance start, from the separated state to the pressure-contact state after a difference between a sheet length of the continuous sheet and a conveyance path length becomes equal to or less than a predetermined amount, the continuous sheet being passed between the fixing nip and the downstream-side conveyance nip.

4. The image forming apparatus according to claim 2, wherein the detection section detects a separation distance between the fixing members forming the fixing nip.

5. The image forming apparatus according to claim 2, wherein the detection section detects driving torque of one of the fixing members or driving torque of the pressure-contact/separation section.

6. The image forming apparatus according to claim 1, wherein the control section controls driving speeds of a conveyance member in the downstream-side conveyance section at a conveyance start and at a conveyance stop.

7. The image forming apparatus according to claim 6, wherein the control section controls a rising speed of the conveyance member in the downstream-side conveyance section faster and controls a falling speed of the conveyance member in the downstream-side conveyance section slower as a thermal expansion amount of the fixing member is larger.

8. The image forming apparatus according to claim 1, wherein the detection section detects a surface temperature of the fixing member, a temperature of a core metal of the fixing member, and an ambient temperature within the fixing section.

9. The image forming apparatus according to claim 1, wherein the detection section detects an outer diameter of the fixing member.

10. The image forming apparatus according to claim 1, wherein the control section controls the driving aspect such that a conveyance start timing in the downstream-side conveyance section coincides with a conveyance start timing in the fixing section.

11. The image forming apparatus according to claim 1, wherein the control section controls the driving aspect such that a conveyance stop timing in the downstream-side conveyance section is identical to or later than a conveyance stop timing in the fixing section.

12. The image forming apparatus according to claim 1, wherein the control section controls the driving aspect of the fixing section and the driving aspect of the downstream-side conveyance section based on media information of the continuous sheet in use in addition to the detection result.

13. The image forming apparatus according to claim 12, wherein the media information includes at least one of a material, a melting point, a thickness, a basis weight, stiffness, and/or a friction coefficient of the continuous sheet.

14. The image forming apparatus according to claim 13, comprising a media information detection section that detects a physical property of the continuous sheet as the media information.

15. The image forming apparatus according to claim 1, wherein the control section corrects, according to durability of the fixing section and durability of the downstream-side conveyance section, the driving aspect controlled based on the detection result.

16. The image forming apparatus according to claim 15, wherein the control section sets a correction amount by comparing the driving aspect controlled based on the detection result with an actual driving aspect.

17. A conveyance method in an image forming apparatus capable of printing on continuous sheet, the conveyance method comprising:

conveying the continuous sheet by a fixing nip that fixes an image on an unfixed surface of the continuous sheet, the fixing nip being formed by fixing members;

conveying the continuous sheet by a downstream-side conveyance nip disposed on a downstream side of the fixing nip in a sheet conveyance direction;

detecting a physical amount related to a thermal expansion state of a fixing member of the fixing members that form the fixing nip;

controlling a driving aspect of at least one of a fixing section and/or a downstream-side conveyance section based on the detected physical amount related to the thermal expansion state, the fixing section being a fixing section in which the fixing nip is disposed, the downstream-side conveyance section being a downstream-side conveyance section in which the downstream side conveyance nip is disposed; and controlling a pressure-contact/separation section to bring the fixing members that form the pressure nip into pressure contact with each other and to separate the fixing members from each other, wherein a driving start timing of a conveyance member in the downstream-side conveyance section is set to be a time after a start of a pressure-contact operation of the pressure-contact/separation section and a driving stop timing of the conveyance member in the downstream-side conveyance section is set to be a time after a start of a separation operation of the pressure-contact/separation section, and the step of controlling a driving aspect includes adjusting the driving start timing of the conveyance member in the downstream-side conveyance section to an earlier time after the start of the pressure-contact operation as the physical amount indicates that a thermal expansion amount of the fixing member increases, adjusting the driving stop timing of the conveyance member in the downstream-side conveyance section to a later time after the start of the separation operation as the physical amount indicates that a thermal expansion amount of the fixing member increases, or both.

18. A non-transitory computer-readable recording medium storing a program, the program causing a computer of an image forming apparatus to execute predetermined processing, the image forming apparatus capable of printing on continuous sheet, wherein the predetermined processing includes:

conveying the continuous sheet by a fixing nip that fixes an image on an unfixed surface of the continuous sheet, the fixing nip being formed by fixing members;

conveying the continuous sheet by a downstream-side conveyance nip disposed on a downstream side of the fixing nip in a sheet conveyance direction;

detecting a physical amount related to a thermal expansion state of a fixing member that forms the fixing nip;

controlling a driving aspect of at least one of a fixing section, in which the fixing nip is disposed, and a downstream-side conveyance section, in which the downstream-side conveyance nip is disposed, based on the detected physical amount related to the thermal expansion state; and controlling a pressure-contact/separation section to bring the fixing members that form the pressure nip into pressure contact with each other and to separate the fixing members from each other, wherein a driving start timing of a conveyance member in the downstream-side conveyance section is set to be a time after a start of a pressure-contact operation of the pressure-contact/separation section and a driving stop timing of the conveyance member in the downstream-side conveyance section is set to be a time after a start of a separation operation of the pressure-contact/separation section, and the controlling a driving aspect includes adjusting the driving start timing of the conveyance member in the downstream-side conveyance section to an earlier time after the start of the pressure-contact operation as the physical amount indicates that a thermal expansion amount of the fixing member increases, adjusting the driving stop timing of the conveyance member in the downstream-side conveyance section to a later time after the start of the separation operation as the physical amount indicates that a thermal expansion amount of the fixing member increases, or both.

* * * * *